US00RE48551E

(19) United States
(12) Reissued Patent
Hikichi

(10) Patent Number: US RE48,551 E
(45) Date of Reissued Patent: May 11, 2021

(54) IMAGE PROCESSING DEVICE SETTING CONFLICT DETERMINATION

(71) Applicant: CANON KABUSHIKI KAISHA, Tokyo (JP)

(72) Inventor: Yukiyoshi Hikichi, Tokyo (JP)

(73) Assignee: CANON KABUSHIKI KAISHA, Tokyo (JP)

(21) Appl. No.: 14/568,931

(22) Filed: Dec. 12, 2014

Related U.S. Patent Documents

Reissue of:
(64) Patent No.: 8,345,281
Issued: Jan. 1, 2013
Appl. No.: 11/695,632
Filed: Apr. 3, 2007

(30) Foreign Application Priority Data

Apr. 4, 2006 (JP) ..... 2006-102925
Mar. 12, 2007 (JP) ..... 2007-061657

(51) Int. Cl.
*G06F 3/12* (2006.01)
*H04N 1/00* (2006.01)
*H04N 1/32* (2006.01)

(52) U.S. Cl.
CPC ..... *H04N 1/00413* (2013.01); *H04N 1/0048* (2013.01); *H04N 1/00474* (2013.01);
(Continued)

(58) Field of Classification Search
CPC ..... H04N 1/00413; H04N 1/00474; H04N 1/00477; H04N 1/0048; H04N 1/00482; H04N 1/00483; H04N 1/32101
(Continued)

(56) References Cited

U.S. PATENT DOCUMENTS 5,467,434 A * 11/1995 Hower, Jr. ..... G06F 3/1205 358/1.13
6,975,417 B1 * 12/2005 Hilpl ..... G03G 15/50 358/1.13
(Continued)

FOREIGN PATENT DOCUMENTS

JP 2000-222335 A 8/2000
JP 2000-227847 A 8/2000
(Continued)

OTHER PUBLICATIONS

Coustan et al., "How Operating Systems Work", howstuffworks, Jan. 27, 2005, (http://web.archive.org/web/20050127070225/http://computer.howstuffworks.com/operating-system8.htm).*
(Continued)

*Primary Examiner* — Joshua D Campbell
(74) *Attorney, Agent, or Firm* — Rossi, Kimms & McDowell LLP

(57) ABSTRACT

An image processing device, having plural functions and executing at least any one of the plural functions based on a request from an application program, includes: a storage to store, from among plural setting information selectable to one of the plural functions, simultaneous use possible/impossible information being information concerning a combination of settings usable simultaneously or a combination of settings non-usable simultaneously; a selector to select any one of the plural setting information to at least any one of the plural functions based on the request from the application program; a discriminator to discriminate, by referring to the simultaneous use possible/impossible information, whether or not competitive setting information being the setting information non-usable simultaneously with the setting information selected by the selector exists; and a notification unit to notify the application program of information concerning the competitive setting information, when the discriminator discriminates that the competitive setting information exists.

51 Claims, 14 Drawing Sheets

(52) U.S. Cl.
CPC ..... *H04N 1/00477* (2013.01); *H04N 1/00482* (2013.01); *H04N 1/00493* (2013.01); *H04N 1/32101* (2013.01)

(58) Field of Classification Search
USPC ..... 358/1.9, 1.15, 3.23; 715/824, 825
See application file for complete search history.

(56) References Cited

U.S. PATENT DOCUMENTS

| | | | | |
|---|---|---|---|---|
| 7,218,976 | B2 * | 5/2007 | Minagawa | G06K 15/002 700/67 |
| 7,475,407 | B2 * | 1/2009 | Mitsui | G06F 3/1205 358/1.1 |
| 7,924,444 | B2 * | 4/2011 | Takahashi | G06F 3/0486 358/1.13 |
| 2002/0065807 | A1 * | 5/2002 | Kawamoto | G06F 3/1205 |
| 2003/0011812 | A1 * | 1/2003 | Sesek et al. | 358/1.15 |
| 2003/0181995 | A1 * | 9/2003 | Nagasaka | H04N 1/00241 700/19 |
| 2004/0136023 | A1 * | 7/2004 | Sato | G06F 3/1205 358/1.13 |
| 2006/0072551 | A1 * | 4/2006 | Aoyama et al. | 370/352 |
| 2006/0082802 | A1 * | 4/2006 | Furuya | 358/1.13 |
| 2006/0126103 | A1 * | 6/2006 | Edwards | H04N 1/00408 358/1.15 |
| 2007/0146784 | A1 * | 6/2007 | Perry | G06Q 10/10 358/1.16 |

FOREIGN PATENT DOCUMENTS

| | | | |
|---|---|---|---|
| JP | 2000222335 | A | 8/2000 |
| JP | 2000227847 | A | 8/2000 |
| JP | 2002084383 | A | 3/2002 |
| JP | 2005007579 | A | 1/2005 |

OTHER PUBLICATIONS

"Application Program Interface", Feb. 15, 1995, FOLDOC: Free Online Dictionary of Comouting (http://foldoc.org/application%20program%20interface).*
Office Action issued in U.S. Pat. No. 8,345,281 dated Sep. 29, 2010.
Office Action issued in U.S. Pat. No. 8,345,281 dated Apr. 19, 2011.
Office Action issued in U.S. Pat. No. 8,345,281 dated Mar. 14, 2012.
Notice of Allowance issued in U.S. Pat. No. 8,345,281 dated Aug. 31, 2012.

* cited by examiner

MEMORY MAP OF STORAGE MEDIUM

FIG. 14

1402

| | TWO PAGE COPY | COVER/ INTERLEAVING | REDUCTION LAYOUT | SHIFT | BOOK BINDING | OHP INTERLEAVING | JOB END NOTIFICATION | BINDING MARGIN | ... |
|---|---|---|---|---|---|---|---|---|---|
| TWO PAGE COPY | | × | × | ○ | × | × | ○ | ○ | ... |
| COVER/ INTERLEAVING | × | | × | ○ | ○ | × | ○ | ○ | ... |
| REDUCTION LAYOUT | × | × | | ○ | × | × | ○ | ○ | ... |
| SHIFT | ○ | ○ | ○ | | ○ | ○ | ○ | ○ | ... |
| BOOK BINDING | × | ○ | × | ○ | | × | ○ | × | ... |
| OHP INTERLEAVING | × | × | × | ○ | × | | ○ | ○ | ... |
| JOB END NOTIFICATION | ○ | ○ | ○ | ○ | ○ | ○ | | ○ | ... |
| BINDING MARGIN | ○ | ○ | ○ | ○ | × | ○ | ○ | | ... |
| ... | ... | ... | ... | ... | ... | ... | ... | ... | |

1401

6005

IMAGE PROCESSING DEVICE SETTING CONFLICT DETERMINATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This is a reissue of U.S. Pat. No. 8,345,281, which issued on Jan. 1, 2013 and was filed as U.S. patent application Ser. No. 11/695,632 on Apr. 3, 2007. The contents of U.S. patent application Ser. No. 11/695,632 are hereby incorporated herein by reference.*

BACKGROUND OF THE INVENTION

1. Field of the Invention

The present invention relates to control of an image processing device which executes an image processing function to a request from an application.

2. Description of the Related Art

In recent years, a digital multifunction device based on a digital copying machine and having a scan function, a printer function and a network transmission/reception function has been in practical use, and an image processing device such as the digital multifunction device of this type has been increasingly sophisticated. More specifically, the image processing device may not only execute copying of a paper original but also store image data as a file in a database provided in a hard disk thereof. Moreover, a function of transmitting image data by various network protocols has been in practical use. More specifically, the image processing device may transmit the file stored in the database thereof by an E-mail onto a network.

In this connection, the above functions of the digital multifunction device are often combined with an information processing system of an existing customer so as to improve customer's business.

To cope wish such an environment, an environment that an individual application can be added to the digital multifunction device has been manufactured.

For example, an image database system is constructed by operating, on the multifunction device, an application which uses the image scan function and an image format conversion function of the digital multifunction device, and cooperating the multifunction device with the database on the information processing system.

On the other hand, it should be noted that various kinds of image processing devices exist in a customer's office, and functions and restrictions of the respective image processing devices are different from others.

For example, if the two image processing devices were manufactured by an identical manufacturer but types thereof are different from each other, usable functions for the respective image processing devices may be different, whereby there is a possibility that processing procedures of the respective image processing devices are restricted. In such a case, it is necessary to provide the plural applications with respect to each of plural kinds of image processes.

To cope with such a problem, a technique of abstracting the functions of the image processing device and absorbing differences due to kinds of devices from the application has been proposed in Japanese Patent Application Laid-Open No. 2000-222335.

By the above technique, it is possible to make software for providing a copy function applicable to any free combination of scanners and printers of different manufacturers. In other words, it is possible by virtualizing the differences in the devices to provide an environment in which application software can be easily developed.

On the other hand, since performance of a recent image processing device remarkably increases, the functions of the image processing device to be used by the application software increases. For example, a recent printer can normally execute a complicated book binding process, a process of merging plural pages into one page, and the like.

However, if kinds of functions increase like this, a restriction occurs on combinations of the functions. For example, a page serial copy function for dividing one-page original into plural outputs and a reduction layout function for merging an original of plural pages into a one-page output cannot be designated simultaneously.

Further, there is a fact that a certain kind of function cannot be used according to a condition of hardware. For example, when there is no staple in a stapler, it is necessary to preclude a user from executing a stapling process to output papers. That is, it is impossible by only virtualizing the differences in the devices to cope with such a device-dependent restriction.

Furthermore, it is difficult for a person who is an application software developer but is not an engineer of a device manufacturer to effectively and satisfactorily design actual application software.

SUMMARY OF THE INVENTION

The present invention has been completed in order to solve such conventional problems as described above, and an object thereof is to provide a mechanism which can reduce a load necessary in development of applications concerning the specifications of a device, and the like.

Another object of the present invention is to provide a mechanism which can change, even if an erroneous attribute value is set to an image processing device by an application, the set erroneous attribute value to a default setting value and thus eliminate inconsistency between the set erroneous attribute value with another attribute value.

In any case, an image processing device which can solve the above problems has the following characteristics.

That is, the image processing device is characterized by an image processing device which has plural functions and executes at least any one of the plural functions based on a request from an application program, comprising: a storage unit configured to store, from among plural setting information capable of being selected to one of the plural functions, simultaneous use possible/impossible information which is information concerning a combination of settings capable of being used simultaneously or a combination of settings incapable of being used simultaneously; a selection unit configured to select any one of the plural setting information with respect to at least any one of the plural functions based on the request from the application program; a discrimination unit configured to discriminate, by referring to the simultaneous use possible/impossible information, whether or not competitive setting information which is the setting information incapable of being used simultaneously with the setting information selected by the selection unit exists; and a notification unit configured to notify the application program of information concerning the competitive setting information, in a case where the discrimination unit discriminates that the competitive setting information exists.

Further, the image processing device is characterized by an image processing device which has plural functions and executes at least any one of the plural functions based on a request from an application program, comprising: a storage unit configured to store, from among plural setting information capable of being selected to one of the plural functions, simultaneous use possible/impossible information which is information concerning a combination of settings capable of being used simultaneously or a combination of settings incapable of being used simultaneously; a selection unit configured to select any one of the plural setting information with respect to at least any one of the plural functions based on the request from the application program; and a reset unit configured to reset the setting information incapable of being used simultaneously with the setting information selected by the selection unit to a predetermined attribute value, by referring to the simultaneous use possible/impossible information.

Besides, an image processing method which can solve the above problems has the following characteristics.

That is, the image processing method is characterized by a control method for an image processing device which has plural functions and executes at least any one of the plural functions based on a request from an application program, the control method comprising the steps of: selecting any one of plural setting information with respect to at least any one of the plural functions based on the request from the application program; discriminating whether or not competitive setting information which is the setting information incapable of being used simultaneously with the setting information selected in the selection step exists, by referring to a storage unit which stores, from among the plural setting information capable of being selected to one of the plural functions, simultaneous use possible/impossible information which is information concerning a combination of settings capable of being used simultaneously or a combination of settings incapable of being used simultaneously; and notifying the application program of information concerning the competitive setting information, in a case where it is discriminated in the discriminating step that the competitive setting information exists.

Further, the image processing method is characterized by a control method for an image processing device which has plural functions and executes at least any one of the plural functions based on a request from an application program, the control method comprising the steps of: selecting any one of plural setting information with respect to at least any one of the plural functions based on the request from the application program; and resetting the setting information incapable of being used simultaneously with the setting information selected in the selection step to a predetermined attribute value, by referring to a storage unit which stores, from among the plural setting information capable of being selected to one of the plural functions, simultaneous use possible/impossible information which is information concerning a combination of settings capable of being used simultaneously or a combination of settings incapable of being used simultaneously.

Further features of the present invention will become apparent from the following description of exemplary embodiments with reference to the attached drawings.

BRIEF DESCRIPTION OF THE DRAWINGS

FIG. 14 is a diagram illustrating an example of a setting competitive table.

DESCRIPTION OF THE EXEMPLARY EMBODIMENTS

Subsequently, the exemplary embodiments of the present invention will be described with reference to the attached drawings.

<Description of System Constitution>

First Exemplary Embodiment

First, an image processing device to which the present invention is applied will be explained.

Figure 1A:
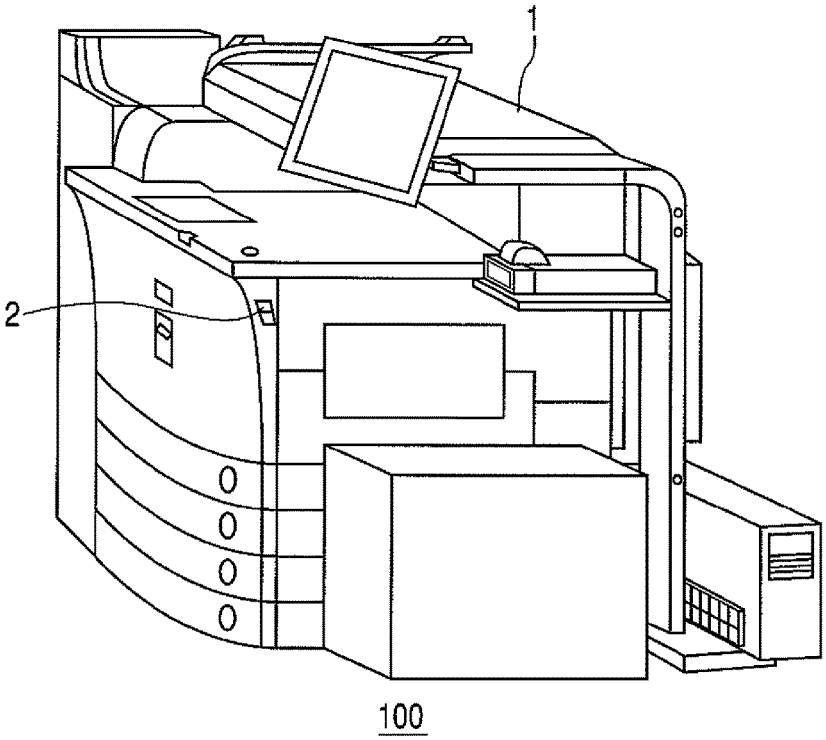
FIGS. 1A and 1B are perspective diagrams illustrating outward appearances of an image processing device according to the first exemplary embodiment of the present invention.
Figure 1B:
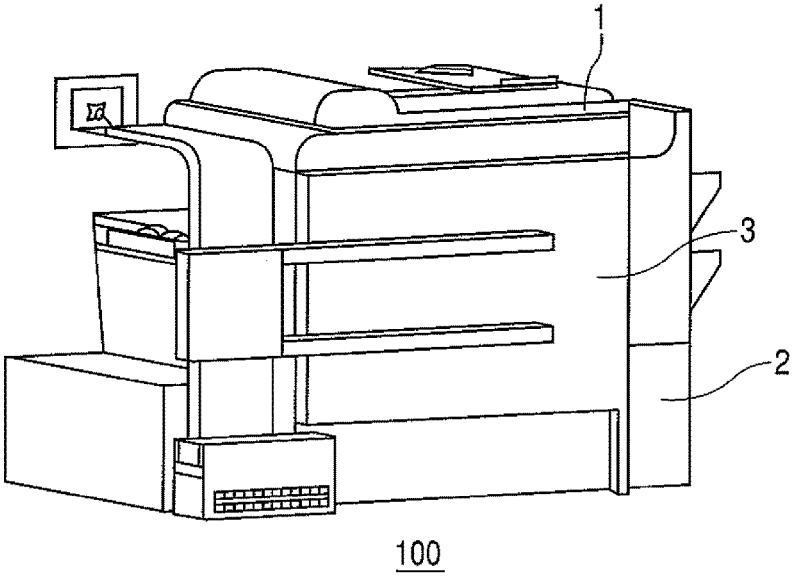

FIGS. 1A and 1B are perspective diagrams illustrating outward appearances a digital multifunction device which is an example of the image processing device according to the first exemplary embodiment of the present invention. More specifically, FIG. 1A is the perspective diagram viewed from the front right side of the image processing device, and FIG. 1B is the perspective diagram viewed from the rear side of the image processing device.

In FIGS. 1A and 1B, an image processing device 100 includes a scanner unit 1 for reading an image on a paper original and converting it into digital image data, and a printer unit 2 for outputting the converted image data to a paper as a printed material. In the following, the image processing device 100 may be called the multifunction device 100 on occasion.

Further, the image processing device 100 includes a control device 3 to which a network is connected, and which contains software and hardware for executing various digital data processes and network communication.

Figure 2:
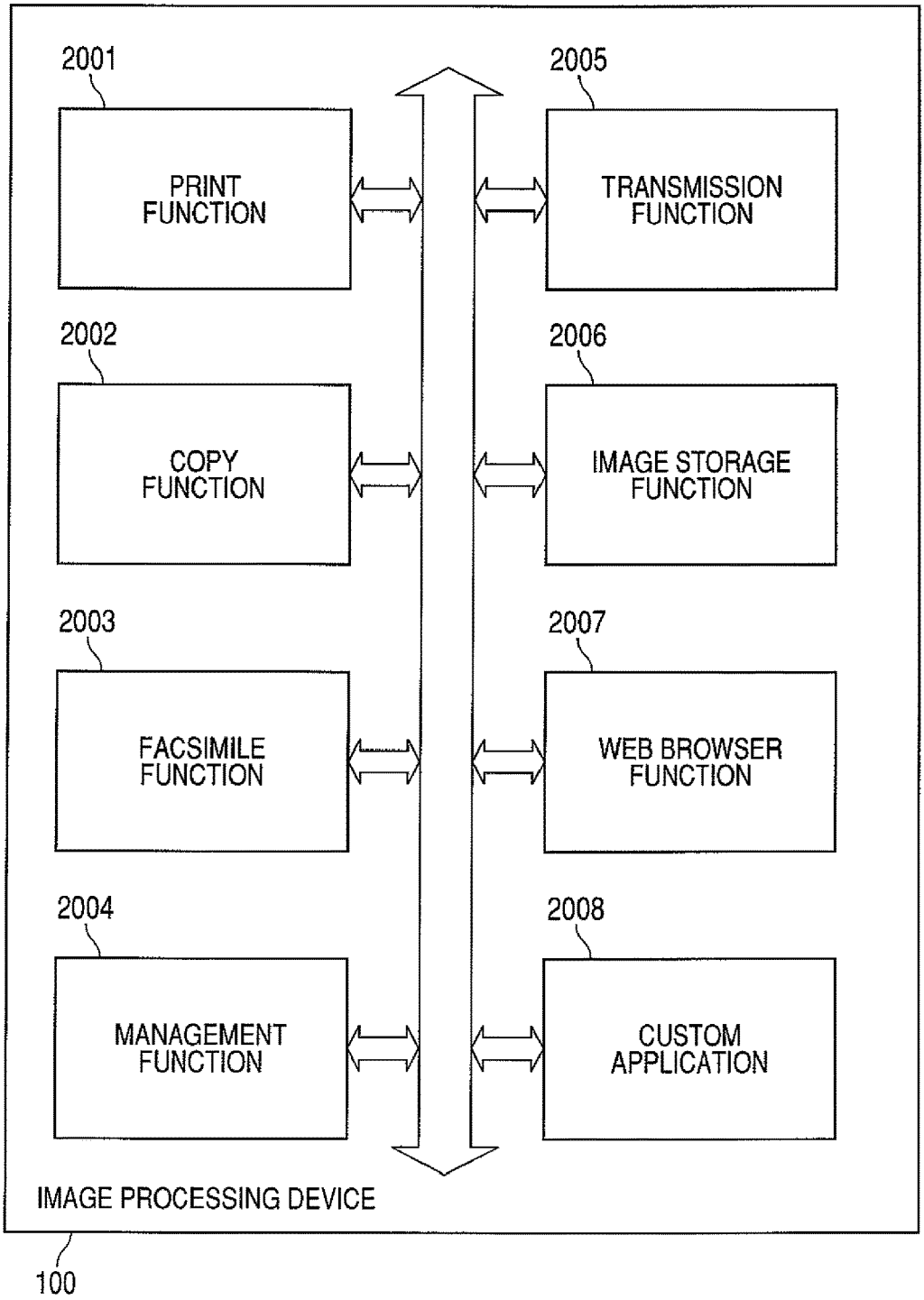
FIG. 2 is a block diagram for describing functions of the image processing device illustrated in FIGS. 1A and 1B.

FIG. 2 is a block diagram for describing plural functions of the image processing device illustrated in FIGS. 1A and 1B.

In FIG. 2, a print function 2001 receives print data transmitted from a host computer with a PDL (Page Description Language) such as a PostScript™, a LIPS™ or the like. Further, the print function 2001 executes a predetermined rasterization process to the print data, and then executes print output of the processed print data.

Further, the print function 2001 can execute a direct print function for directly receiving and printing application data such as PDF data without using a printer driver installed in the host computer or the like.

A copy function 2002 can execute a copy process by using the scanner unit 1 and the printer unit 2.

A facsimile function 2003 can execute G3 and G4 facsimile transmission/reception. Also, the facsimile function 2003 can execute Internet facsimile by using the Internet.

A management function 2004 executes a department management function and an individual authentication function. Further, the management function 2004 includes a management data auto distribution (delivery) function for synchronizing various settings among pleural digital multifunction devices.

A transmission function 2005 provides a universal send function for simultaneously transmitting (or sending) image data to plural destinations by using plural network protocols. Further, the transmission function 2005 includes a function for encrypting and then transmitting image data, and a function for transmitting image data with an electronic signature added.

An image storage function 2006 provides a function for storing scanned image data and image data received from a network in a hard disk provided in the image processing device 100. Further, the image storage function 2006 provides a function for displaying the stored image data on an operation panel, and a function for executing an editing process to the stored image data.

A Web browser function 2007 provides a function for browsing a website through a Web browser, a Web pull print function for designating and printing an image file on the network.

A custom application 2008 provides a customized application execution environment by an open platform in which an application using the functions of the digital multifunction device can be executed by using a Java™ language.

Figure 3:
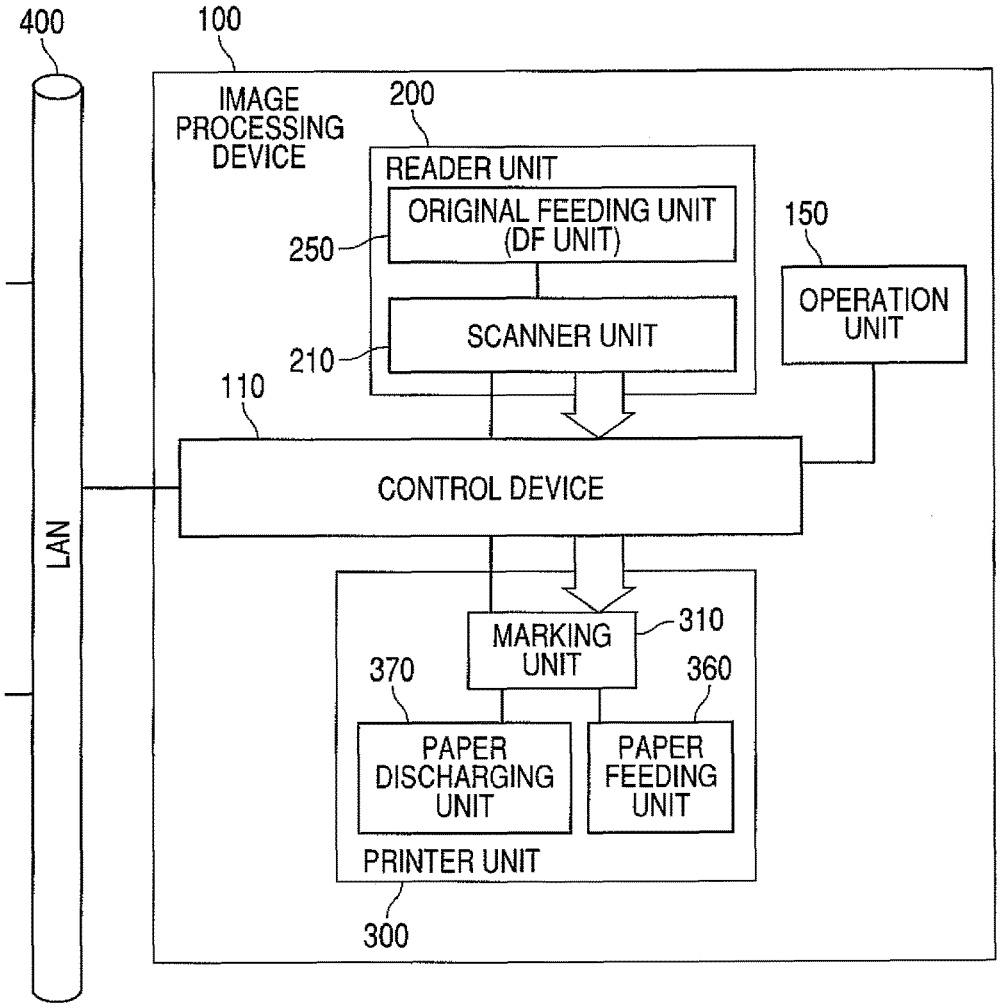
FIG. 3 is a block diagram illustrating the control constitution of each unit included in the image processing device illustrated in FIGS. 1A and 1B.

FIG. 3 is a block diagram illustrating the control constitution of each unit included in the image processing device illustrated in FIGS. 1A and 1B.

In FIG. 3, the image processing device 100 provides various image processing functions such as a copy function, a print function, an image input (scan) function, an image filing function, an image transmission/reception function, an image conversion function, and the like.

A reader unit (image input device) 200 optically reads an original image and then converts the read original image into image data. Besides, the reader unit 200 includes a scanner unit 210 having a function for reading the original image, and an original feeding unit 250 having a function for feeding and transporting original papers. Here, it should be noted that the reader unit 200 corresponds to the scanner unit 1 illustrated in FIGS. 1A and 1B, and the original feeding unit 250 will also be called a DF (document feeding) unit 250.

A printer unit (image output device) 300 transports a recording paper, prints the image data on the transported recording paper as visual data, and discharges the image-printed recording paper outward. Here, it should be noted that the printer unit 300 corresponds to the printer unit 2 illustrated in FIGS. 1A and 1B.

The printer unit 300 includes a paper feeding unit 360 having plural kinds of recording paper cassettes, and a marking unit 310 having a function for transferring and fixing the image data to the recording paper. Further, the printer unit 300 includes a paper discharging unit 370 having a function for sorting and/or stapling the image-printed recording papers and then outputting such processed recording papers outward.

A control device 110 is electrically connected to the reader unit 200 and the printer unit 300, and further connected to a LAN (local area network) 400. The control device 110 controls the reader unit 200 to read the original image data, and further controls the printer unit 300 to output the image data to the recording paper, thereby providing the copy function. Here, it should be noted that the control device 110 corresponds to the control device 3 illustrated in FIGS. 1A and 1B.

Further, the control device 110 has an image transmission function for converting image data read through the reader unit 200 into code data and then transmitting the acquired code data to a not-illustrated host computer or not-illustrated another image processing device through the LAN 400. Furthermore, the control device 110 has a print function for converting print data received from the host computer through the LAN 400 into image data and then outputting the acquired image data to the printer unit 300.

An operation unit 150 is connected to the control device 110. The operation unit 150 includes a liquid crystal touch panel, thereby providing a user I/F (interface) by which a user handles and operates an image input/output system.

Figure 4:
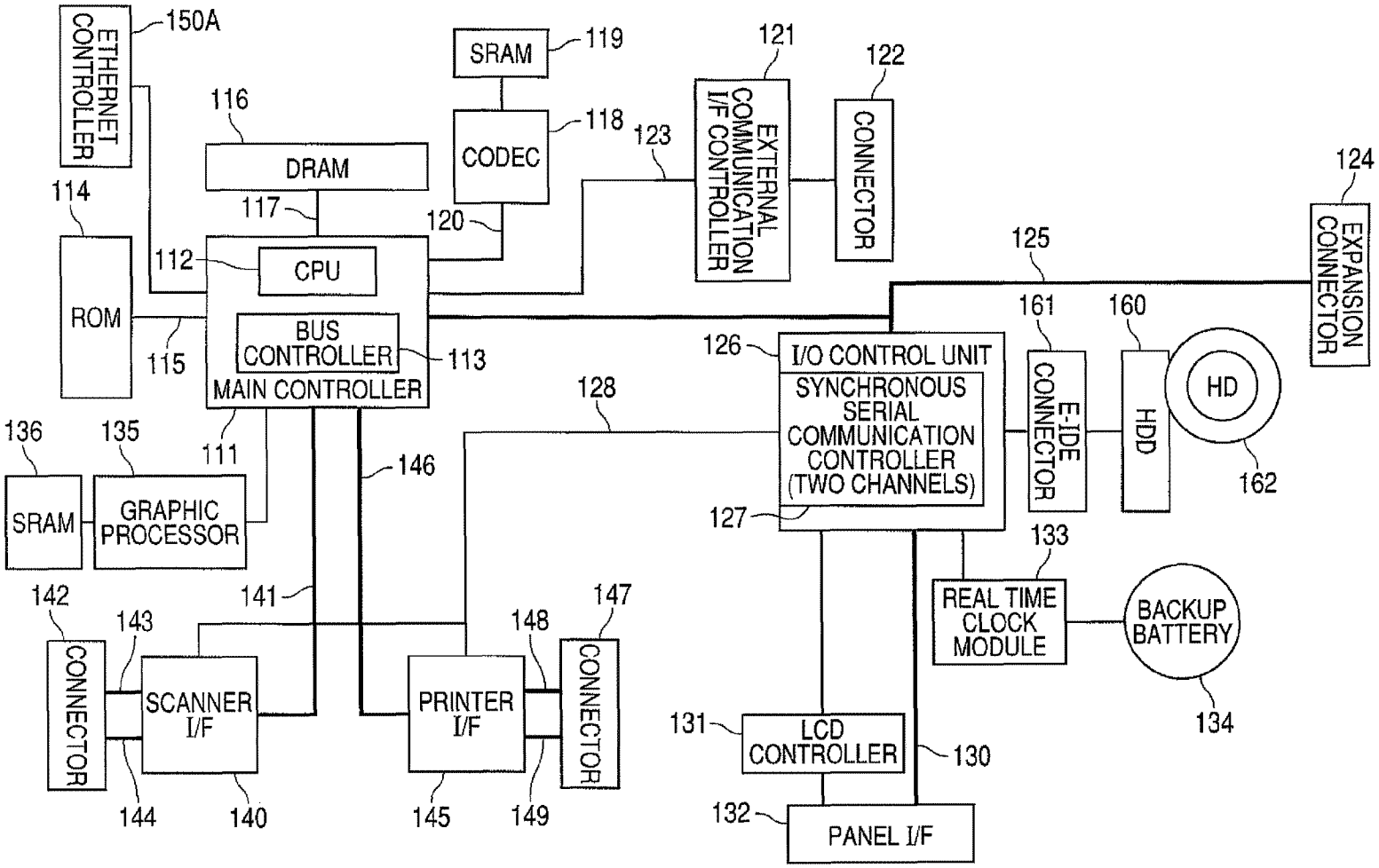
FIG. 4 is a block diagram illustrating the hardware constitution of the control device illustrated in FIG. 3.

FIG. 4 is a block diagram illustrating the hardware constitution of the control device 110 illustrated in FIG. 3.

In FIG. 4, a main controller 111 mainly includes a CPU 112, a bus controller 113 and various I/Fs.

The CPU 112 and the bus controller 113 control the whole operation of the control device 110, and the CPU 112 operates based on a program read from a ROM 114 through a ROM I/F 115.

The operation to cause the CPU 112 to interpret the PDL included in the print data received from the host computer and extract the PDL print data into raster image data has been described in the read program, and this program is processed by the software. Further, the bus controller 113 controls data transfer from/to each I/F, and further controls adjustment of bus contention and DMA (Direct Memory Access) transfer.

A DRAM (Dynamic Random Access Memory) 116 is connected to the main controller 111 through a DRAM I/F 117. The DRAM 116 is used as the working area by which the CPU 112 operates, and/or the area where the image data is stored.

An Ethernet™ controller 150A is a network controller for connecting to the LAN 400. That is, the Ethernet™ controller 150A enables the main controller 111 to access the network.

A codec 118 compresses the raster image data stored in the DRAM 116 in a compression method such as an MH (Modified Huffman) method, an MR (Modified READ (relative element address designate)) method, an MMR (Modified Modified READ) method, a JBIG (Joint Bi-level Image Experts Group) method, or a JPEG (Joint Photographic Experts Group) method. Contrarily, the codec 118 extracts the compressed and stored code data into the raster image data.

An SRAM (Static RAM) 119 is used as the temporary working area of the codec 118. The codec 118 is connected to the main controller 111 through an I/F 120, and the data transfer between the coded 118 and the DRAM 116 is executed by DMA transfer under the control of the bus controller 113.

A graphic processor 135 executes various image processes such as an image rotation process, a magnification changing process, a color space conversion process, and the like. An SRAM 136 is used as the temporary working area of the graphic processor 135.

An external communication I/F controller 121, which is connected to the main controller 111 through an I/F 123, is connected to an external network through a connector 122.

An expansion connector 124 for connecting an expansion board and an I/O (input/output) control unit 126 are connected to a general-purpose high-speed bus 125 to which, for example, a PCI (Peripheral Component Interconnect) bus is used.

A two-channel synchronous serial communication controller 127 for transmitting/receiving control commands to/from the CPU of each of the reader unit 200 and the printer unit 300 is provided in the I/O control unit 126. Further, the synchronous serial communication controller 127 is connected to a scanner I/F 140 and a printer I/F 145 through an I/O bus 128.

A panel I/F 132 is connected to an LCD (liquid crystal display) controller 131 which is further connected to the I/O control unit 126. The panel I/F 132 includes the I/F for executing display on the liquid crystal screen on the operation unit 150 (FIG. 3) and a key input I/F 130 through which hard key inputting and touch panel key inputting are executed.

A connector 142 which is connected to the reader unit 200 includes a synchronous serial I/F 143 and a video I/F 144, and a connector 147 which is connected to the printer unit 300 includes a synchronous serial I/F 148 and a video I/F 149.

The scanner I/F 140 is connected to the reader unit 200 through the connector 142, and is further connected to the main controller 111 by a scanner bus 141. The scanner I/F 140 has a function for executing a predetermined process to the image data received from the reader unit 200, and further has a function for outputting a control signal generated based on the video control signal transferred from the reader unit 200 to the scanner bus 141.

The data transfer from the scanner bus 141 to the DRAM 116 is executed under the control of the bus controller 113.

The printer I/F 145 is connected to the printer unit 300 through the connector 147, and is further connected to the main controller 111 through a printer bus 146. The printer I/F 145 executes a predetermined process to the image data output from the main controller 111. Besides, the printer I/F 145 has a function for outputting the image data to the printer unit 300, and further has a function for outputting a control signal generated based on the video control signal transferred from the printer unit 300 to the printer bus 146.

The transfer of the raster image data on the DRAM 116 to the printer unit 300 is executed under the control of the bus controller 113. That is, the raster image data is subjected to the DMA transfer to the printer unit 300 through the printer bus 146 and the video I/F 149.

The operation unit 150 includes a liquid crystal display unit, a touch panel input unit attached on the liquid crystal display unit, and plural hard keys. The signal input through the touch panel input unit or the hard key is transferred to the CPU 112 through the panel I/F 132, and the image data transferred from the panel I/F 132 is displayed on the liquid crystal display unit. More specifically, an operation screen, image data and the like concerning the operation of the image processing device 100 are displayed on the liquid display unit.

A real time clock module 133 updates and stores date and time to be managed in the image processing device 100, and the real time clock module 133 is backed up by a backup battery 134.

An E-IDE (Enhanced Integrated Drive Electronics) connector (or E-IDE I/F) 161 is used to connect an external storage device. In the present exemplary embodiment, an HDD (hard disk drive) 160 is connected through the E-IDE I/F 161, whereby the image data is stored/read in/from an HD (hard disk) 162.

Figure 5:
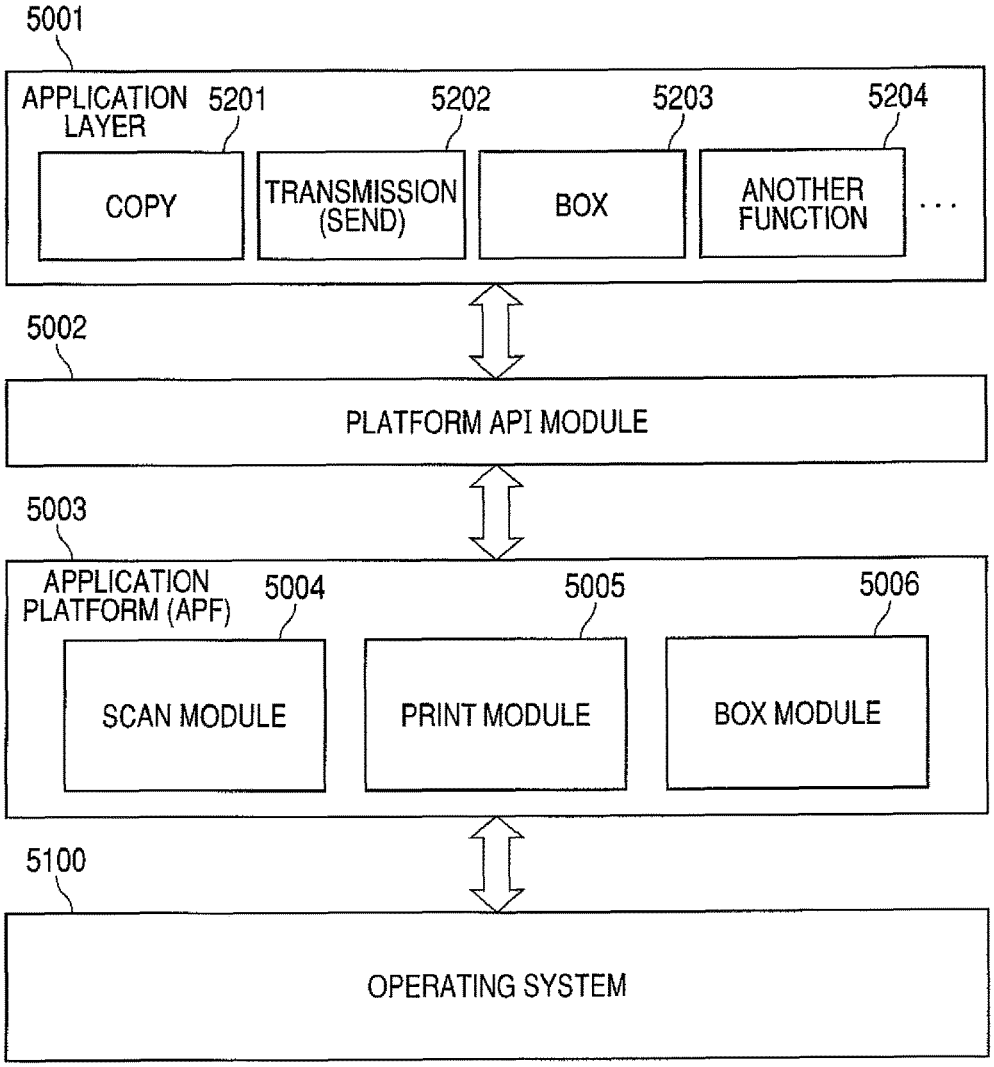
FIG. 5 is a block diagram illustrating the software module configuration of a digital copying machine controller which is a concrete example of the image processing device illustrated in FIGS. 1A and 1B.

FIG. 5 is a block diagram illustrating the software module configuration of the controller of the image processing device 100 illustrated in FIGS. 1A and 1B.

In the present exemplary embodiment, the modules which are relative to the application execution environment of the digital copying machine provided by using the Java™ language will be mainly described.

Here, it should be noted that the Java™ language is the programming language developed by Sun Microsystems in United States, and the software developed by the Java™ language basically operates on any platform without depending on a specific OS or microprocessor.

In recent years, a product for making software development easy by incorporating a Java™ execution environment in the image processing device 100 has been on sale.

In FIG. 5, the software of the image processing device 100 has a hierarchical configuration.

An operating system 5100 is the lowest layer of the software configuration of the image processing device 100, whereby various software is executed on the operating system 5100.

An APF (Application Platform) 5003 operates on the operating system 5100. The APF 5003 is the basis of the function of the image processing device 100, and the APF 5003 includes therein plural sub modules.

In the sub modules of the APF 5003, a scan module 5004 achieves the scan operation of the multifunction device 100, a print module 5005 achieves the print operation of the multifunction device 100, and a box module 5006 achieves the operation for storing a scan image or a PDL image in the HD 162 illustrated in FIG. 4.

Incidentally, each of the sub modules 5004 to 5006 further includes therein sub modules which will be described later.

A platform API (Application Platform Interface) module 5002, which is an API layer for the application program of the platform, provides a Java™ language interface to an application layer 5001.

The application layer 5001 includes plural application program modules 5201, 5202, 5203 and 5204 for achieving the functions of the image processing device 100. These application program modules include business oriented application programs developed by an end user or an application developer. The business oriented application program is the software for executing the process which is specified for the business of each user, whereby the business oriented application program is subjected to modification and/or addition according to a user's request. In the following, it should be noted that the application program will be simply called application, and the application program module included in the application layer will be called UAP (User Application).

In the present exemplary embodiment, the UAP 5201 is a copy application for achieving the copy function of the multifunction device 100, the UAP 5202 is a transmission (send) application for achieving the transmission function of the multifunction device 100, the UAP 5203 is a box application for achieving the box function of the multifunction device 100, and the UAP 5204 is an application for achieving another function of the multifunction device 100.

Incidentally, it is possible to add and/or delete user applications other than the UAPs 5201 to 5204 in the application layer 5001.

Subsequently, the relation of the APF 5003 and the UAPs of the application layer 5001 will be described. That is, the UAP achieves a certain function by using and/or combining the functions provided by the sub modules (the scan module 5004, the print module 5005, and the box module 5006) included in the APF 5003. For example, the UAP 5201 corresponding to the copy function can be achieved by combining the scan module 5004 and the print module 5005. Therefore, in case of executing the copy function, the scan module 5004 and the print module 5005 execute the respective processes.

Incidentally, the UAPs 5201 to 5204, which are the applications using the image processing device 100, are the applications developed by the manufacturer of the image processing device 100, a third party other than the manufacturer, or the like. Each of these applications has the application configuration not depending on the constitution of the image processing device 100. Moreover, each of these applications has the configuration being unconscious of consistency of the setting information for executing the functions of the image processing device 100.

For this reason, if it has been set that the requests from the UAPs 5201 to 5204 cannot be executed by the image processing device 100, such an improper setting is discriminated on the side of the APF 5003. Then, the result of such discrimination is reflected on the operation screen to be displayed on the operation unit 150 by the UAP, whereby it is possible to prevent that a user executes the operation causing the competitive settings.

Figure 6:
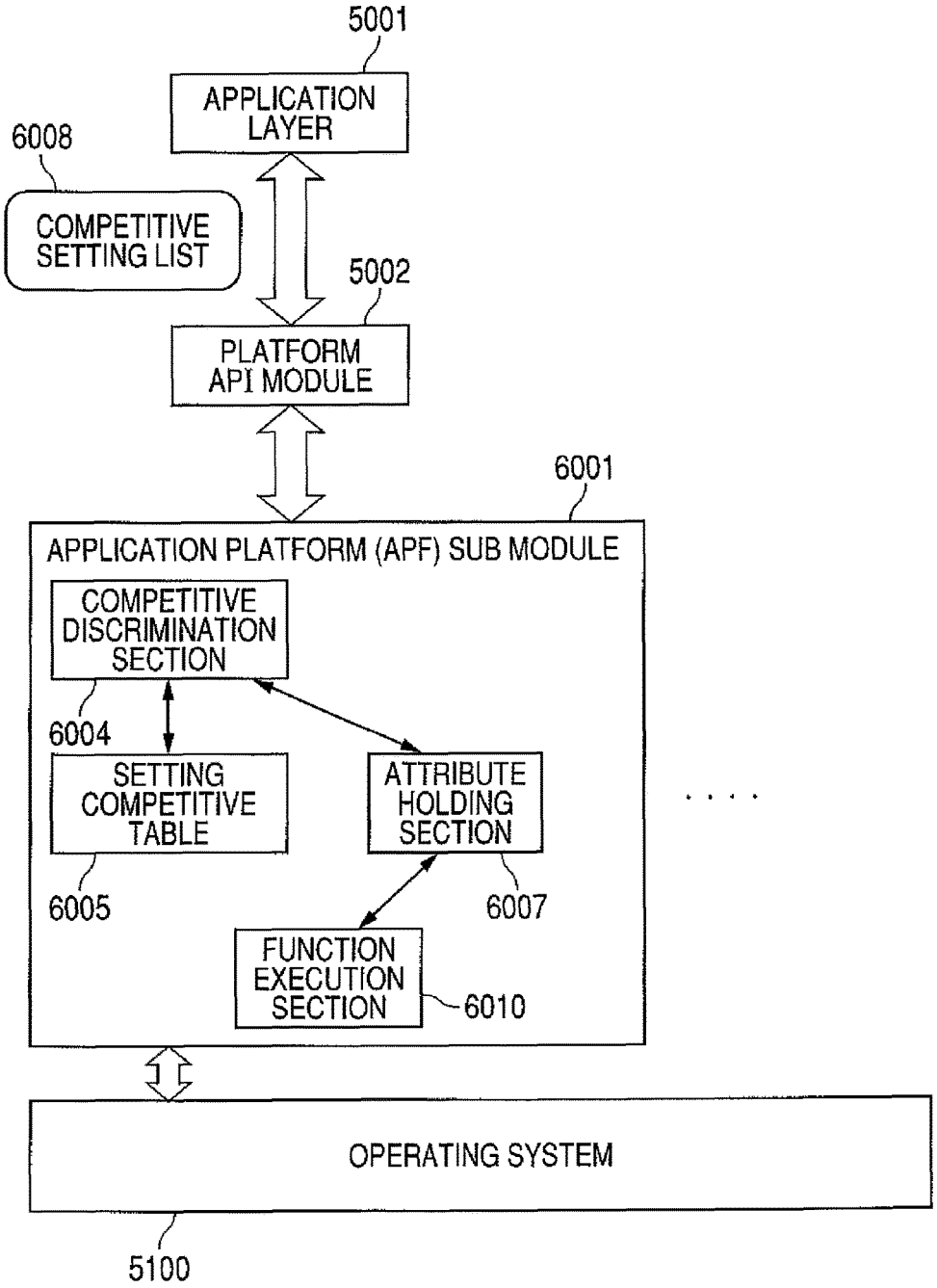
FIG. 6 is a block diagram illustrating the details of the sub modules of an application platform according to the first exemplary embodiment of the present invention.

FIG. 6 is a block diagram illustrating the details of the sub modules of the application platform in the image processing device according to the present exemplary embodiment. In FIG. 6, the same modules as those illustrated in FIG. 5 have the same reference numerals as those illustrated in FIG. 5, respectively, and the explanation thereof will be omitted.

An APF (Application Platform) sub module 6001, which is the sub module of the APF 5003, corresponds to any one of the scan module 5004, the print module 5005, and the box module 5006 illustrated in FIG. 5. The APF sub module 6001 further includes plural sub modules 6004, 6005, 6007 and 6010.

The scan module 5004 includes a function execution section 6010 for executing a process such as a stapling process, a reduction layout process and the like according to the setting information received together with a scan function execution request, and an attribute holding section 6007 representing an attribute concerning the function.

Further, the scan module 5004 includes a setting competitive table 6005 on which the limitations of the function combinations have been described, and a competitive discrimination section 6004 for discriminating consistency of the function combinations by using the value of the current attribute data and the competitive table.

Moreover, each of the print module 5005 and the box module 5006 includes sub modules as well as the scan module 5004.

The competitive discrimination section 6004 discriminates the setting in a competitive state, by referring to the setting competitive table 6005 and the attribute holding section 6007 indicating the state of the image processing device 100. Here, it should be noted that, in the setting in the competitive state, since the contents of the plural settings designated from the UAP are inconsistent, it is impossible to simultaneously set the functions concerning the relevant settings. More specifically, if the contents of the two settings are in the competitive state, these contents cannot be set simultaneously. The competitive discrimination section 6004 is equivalent to the list of the functions each of which competes with the setting designated by the UAP. Then, a competitive setting list 6008 is notified to the application layer 5001 through the platform API module 5002.

Moreover, the attribute holding section 6007 holds the states (information such as installed options) of the image processing device.

Incidentally, it should be noted that plural kinds of competitive rules corresponding to the settings of the competitive state have been set on the setting competitive table 6005. For example, since a "two page copy" setting for dividing one-page original into plural outputs cannot be designated (or used) simultaneously with a "reduction layout" setting, such a fact has been set on the setting competitive table 6005 as the competitive rule. That is, the plural kinds of competitive rules like this have been registered on the setting competitive table 6005.

Further, each of the scan module 5004, the print module 5005 and the box module 5006 includes the setting competitive table 6005, and registers, from among the settings concerning the operations of each module, the competitive settings to the corresponding setting competitive table 6005. For example, the scan module 5004 registers the competitive rules concerning the scan operation (scan function) to the corresponding setting competitive table 6005. Likewise, the print module 5005 registers the competitive rules concerning the print function to the corresponding setting competitive table 6005, and the box module 5006 registers the competitive rules concerning the box function to the corresponding setting competitive table 6005. Incidentally, the setting competitive table 6005 has been stored in the HD 162 or the ROM 114 illustrated in FIG. 4, and is held on the table area secured on the DRAM 116 when the system activates.

The function execution section 6010 executes the operation (function) to be achieved by the APF sub module 6001. For example, the scan module 5004 achieves the operation concerning the original image reading by the image processing device 100.

FIG. 14 is a diagram illustrating an example of the setting competitive table.

That is, FIG. 14 illustrates an example of the setting competitive table 6005 provided in the print module 5005.

In the setting competitive table 6005, items 1401 and 1402 indicate the setting information capable of being set for the print module 5005. Further, the symbol "o" implies that both the settings indicated by the items 1401 and 1402 can be set simultaneously, and the symbol "x" implies that both the settings cannot be set simultaneously. For example, a "book binding" setting and a "cover/interleaving" setting can be set simultaneously, but the "cover/interleaving" setting and the "two page copy" setting cannot be set simultaneously.

Although FIG. 14 illustrates the example of the setting competitive table 6005 provided in the print module 5005, each of the scan module 5004 and the box module 5006 includes the setting competitive table concerning the setting information capable of being set. More specifically, the items 1401 and 1402 of the setting competitive table 6005 provided in the scan module 5004 indicate the setting information concerning the scanning, and the items 1401 and 1402 of the setting competitive table 6005 provided in the box module 5006 indicate the setting information concerning the box.

Figure 7:
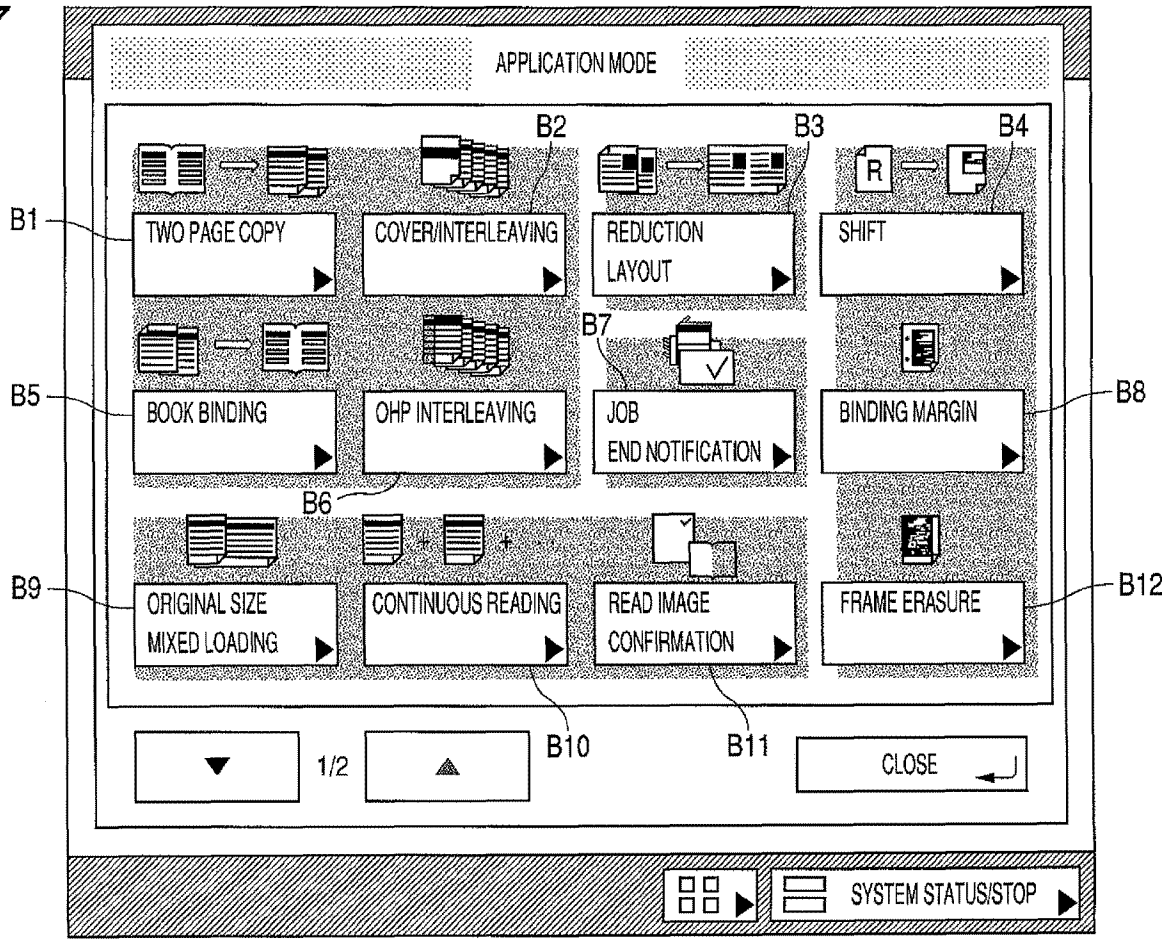
FIG. 7 is a diagram illustrating a display example of an operation screen to be displayed on an operation unit.

FIG. 7 is a diagram illustrating an example of an operation screen to be displayed on the liquid crystal display provided on the operation unit 150 illustrated in FIG. 3. Here, it should be noted that the operation screen illustrated in FIG. 7 is an example of the operation screen of the UAP (copy) 5201. In the following, an operation example of the application in the present exemplary embodiment will be described with reference to FIG. 7.

Here, it should be noted that the operation screen is displayed on the operation unit 150 under the control of the UAP (copy) 5201, and such control will be later described in detail with reference to FIGS. 10 and 11.

As illustrated in FIG. 7, plural settings can be selected as indicated by setting buttons B1 to B12.

For example, the setting button B1 has been set to correspond to the "two page copy" setting for dividing, when a book is used as a copy original, right and left pages of the copy original into two images and then printing the divided images respectively.

The setting button B2 is set to correspond to the "cover/interleaving" setting for interleaving a partition paper into the printed materials. A user who uses the UAP (copy) 5201 notifies the application that a desired processing function has been selected by depressing the corresponding one of the setting buttons B1 to B12.

Here, it should be noted that there are occasions when a certain specific setting and another setting cannot be selected simultaneously.

Figure 8:
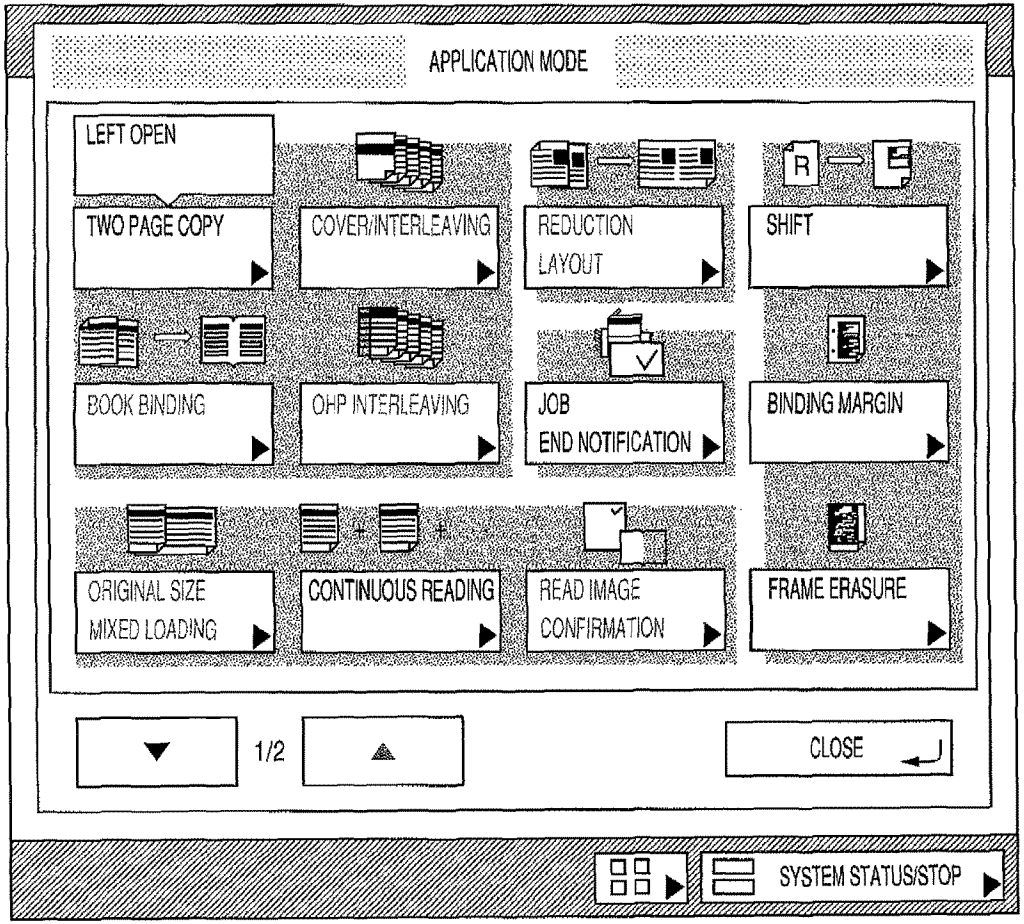
FIG. 8 is a diagram illustrating a display example of the operation screen to be displayed on the operation unit.

FIG. 8 is a diagram illustrating an example of a first function selection disablement screen to be displayed on the liquid crystal display provided on the operation unit 150. Here, it should be noted that the first function selection disablement screen illustrated in FIG. 8 is an example in a case where the "two page copy" setting and the "left open" mode are selected. For this reason, from among the setting buttons B1 to B12 illustrated in FIG. 7, the setting buttons B2, B3, B5, B6, B9 and B11 respectively corresponding to the settings which cannot be set simultaneously with the "two page copy" function and the "left open" mode are set to be in a gray display state for indicating a non-selectable state.

That is, FIG. 8 illustrates that the image processing device 100 cannot select the "cover/interleaving" setting, the "reduction layout" setting, the "book binding" setting, the "OHP interleaving" setting, the "original size mixed loading" setting and the "read image confirmation" setting simultaneously with the "two page copy" setting.

Incidentally, the buttons corresponding to the non-selectable settings are in the gray display state, so that a user cannot designate these settings. Therefore, it is controlled that, even if the gray-displayed button is depressed by the user, the control device 110 does not accept an instruction from the depressed button.

On the other hand, the buttons which are not in the gray display state correspond to the setting information which can be selected together with the "two page copy" setting.

Incidentally, if the user wishes to select another setting, he/she has to depress a not-illustrated reset button to release the "two page copy" setting by once resetting the display state. By doing so, all of the buttons B1 to B12 are selectable.

Figure 9:
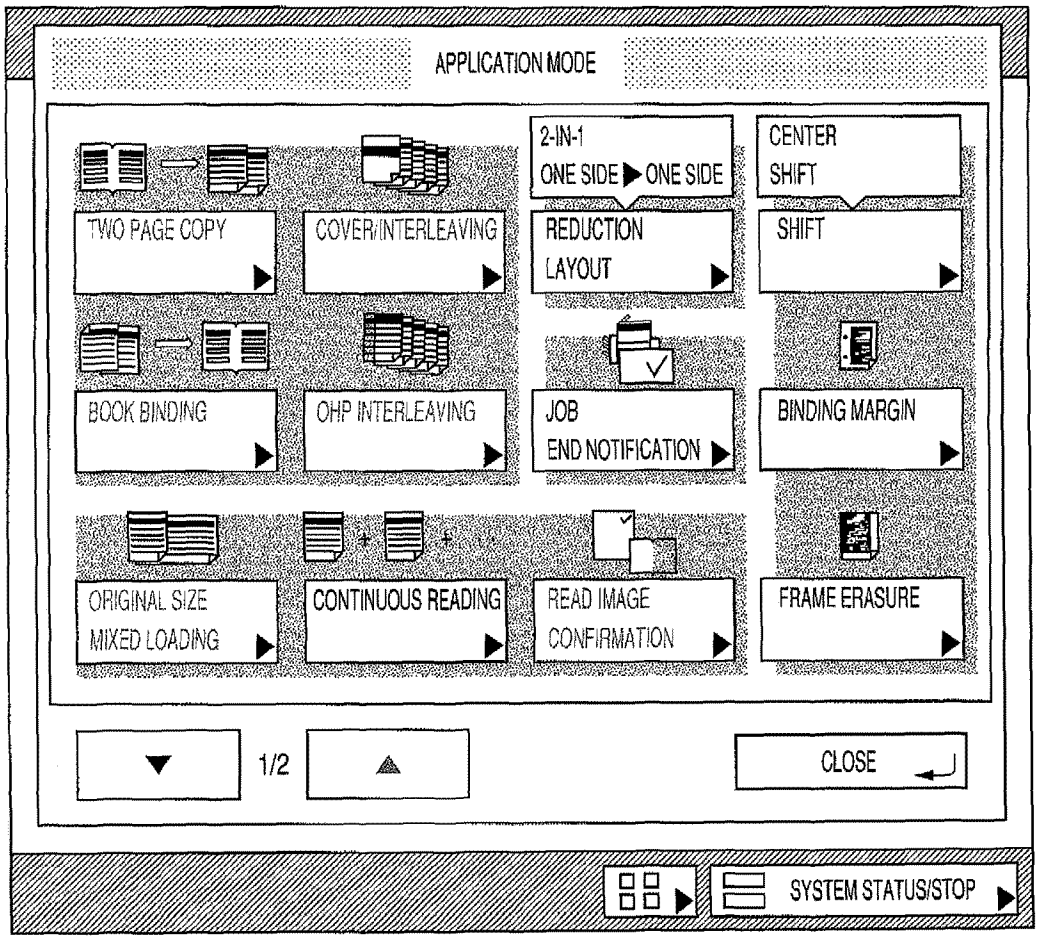
FIG. 9 is a diagram illustrating a display example of the operation screen to be displayed on the operation unit.

FIG. 9 is a diagram illustrating another example of the operation screen to be displayed on the liquid crystal display provided on the operation unit 150.

That is, FIG. 9 illustrates the screen which is displayed when the user selects the "reduction layout" setting by depressing the button B3 on the liquid crystal display provided on the operation unit 150.

In this case, the "two page copy" setting, the "cover/interleaving" setting, the "book binding" setting, the "OHP interleaving" setting, the "original size mixed loading" setting and the "read image confirmation" setting cannot be simultaneously set in the image processing device 100.

For this reason, from among the buttons B1 to B12 illustrated in FIG. 7, the buttons B1, B2, B5, B6, B9 and B11 which are inconsistent with the "reduction layout" setting are set to be in the gray display state as being non-selectable.

As just described, in the image processing device 100 according to the present exemplary embodiment, the buttons corresponding to the settings which cannot be used together with the selected setting are set to be in the non-selectable state (gray display state), so as to notify the user that the gray-displayed buttons cannot be designated.

When the application having the operation screens illustrated in FIGS. 8 and 9 is created, it is necessary to incorporate therein a mechanism for discriminating combinations of the competitive functions.

Conventionally, the mechanism of this kind is provided on the side of the UAP.

Therefore, a person who develops the application (called an application developer hereinafter) has to sufficiently know the function of each device (printer, scanner, memory, etc.) and the items capable of being set in the image processing device 100. However, the application developer is often a third party other than the manufacturer of the image processing device 100 itself, and the relevant third party does not sufficiently know all the functions of the image processing device 100 ordinarily. For this reason, it is highly difficult for the application developer to provide a necessary process for displaying the operation screens as illustrated in FIGS. 8 and 9 in the application developed by him/her.

Further, it is difficult to operate one application in the plural devices. Furthermore, since the application developer is generally different from a device developer, there is a problem that an application cannot operate if a version upgrade is executed for the device.

Consequently, in the present exemplary embodiment, the mechanism for discriminating the competition of settings is not provided on the side of the UAP but is provided on the side of the APF 5003. Thus, since the UAP only has to execute a process to reflect the discriminated result of the platform side on an arbitrary GUI screen, it is possible to reduce the number of steps for developing the application on the side of the third party which creates the UAP.

Further, it is possible to apply the mechanism for discriminating the competition of settings to plural kinds of image processing devices without changing the application.

Subsequently, the processes to be executed by the UAP and the APF sub module 6001 will be described with reference to FIG. 10.

Figure 10:
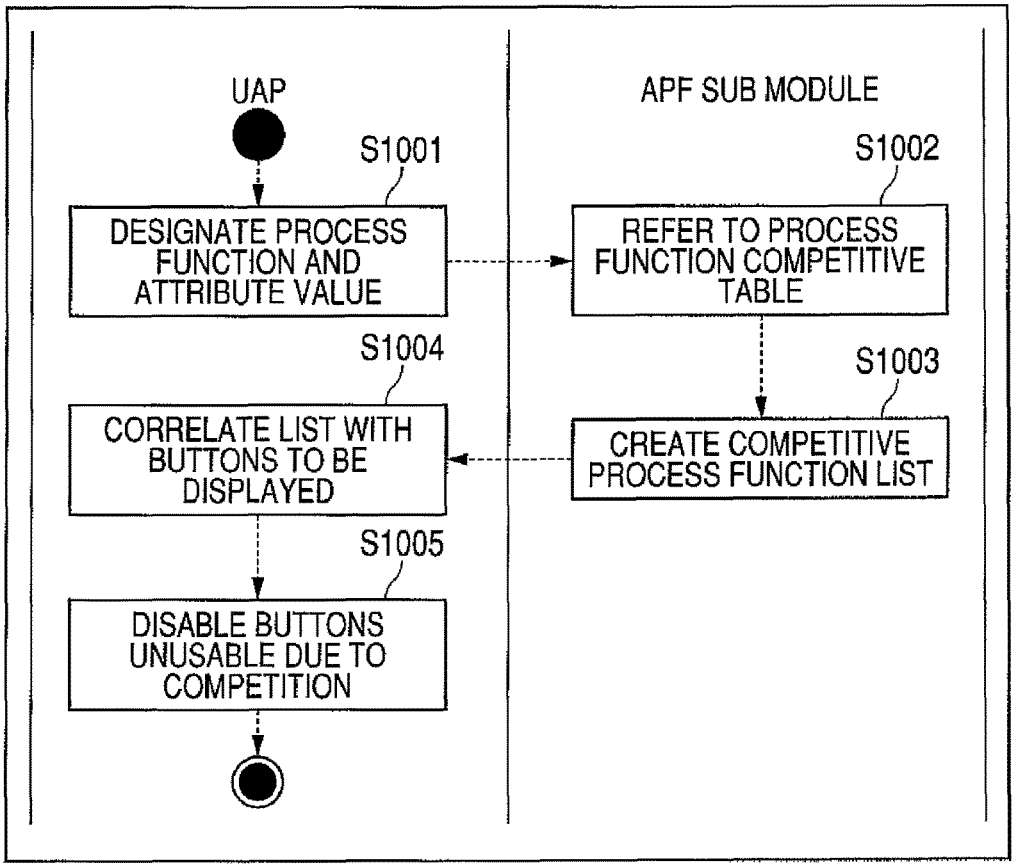
FIG. 10 is a diagram for describing the process to be executed by a UAP (User Application) and an APF (Application PlatForm) sub module according to the first exemplary embodiment of the present invention.

That is, FIG. 10 is a diagram for describing a first data exchange to be executed between the UAP (any one of the UAPs 5201 to 5204) and the APF sub module 6001 in the image processing device according to the present exemplary embodiment. More specifically, FIG. 10 illustrates the process flow in case of acquiring the competitive setting list 6008 in the image processing device 100.

Incidentally, it should be noted that processes S1001, S1004 and S1005 are executed on the side of the UAP, and processes S1002 and S1003 are executed on the side of the APF sub module 6001, and each step is achieved if the CPU 112 illustrated in FIG. 4 executes the program modules of the UAP (any one of the UAPs 5201 to 5204) and the APF 5003.

In FIG. 10, first, the UAP determines the setting information and the setting value in response to the operation executed on the operation unit 150 by the user (S1001), and transfers an ID indicating the setting and the setting value to the platform API module 5002. The APF 5003 which was requested by the platform API module 5002 refers to the setting competitive table 6005 (S1002).

Then, based on the setting ID and the setting value received from the UAP through the platform API module 5002, the competitive discrimination section 6004 which is the sub module of the APF sub module 6001 creates the competitive setting list 6008 which is the information concerning the competitive settings (that is, cannot be used simultaneously), based on the rule defined on the setting competitive table 6005 and the information, held in the attribute holding section 6007, indicating the current states of the image processing device 100 (S1003). Then, as illustrated in FIG. 6, the competitive setting list 6008 which is the array of the competitive setting function IDs is transferred to the UAP as the return value from the API.

If the competitive setting list 6008 is received, the UAP correlates the competitive setting IDs with the respective GUI parts (such as the buttons illustrated in FIGS. 7 and 8) in the screen of the application (S1004), and disables from selecting the GUI parts corresponding to the competitive settings (S1005). Here, as described in FIGS. 8 and 9, to disable from selecting the GUI parts includes to set the buttons to be in the gray display state, and not to accept the depressions of the buttons.

Consequently, for example, the operation screen is displayed on the liquid crystal display on the operation unit 150, as illustrated in FIG. 8.

Incidentally, the button which has a name indicating the setting content as a label is generally used as the GUI parts.

Further, it should be noted that there are occasions when the plural APFs execute the processes in the steps S1002 and S1003. For example, if the UAP (copy) 5201 designates the setting and the setting value, the APF side creates the list of the settings that the scan module 5004 and the print module 5005 compete. Then, the list which are acquired by merging the competitive setting lists respectively created by the scan module 5004 and the print module 5005 is notified to the UAP (copy) 5201.

Based on the setting and the setting value designated by the UAP, the platform API module 5002 determines which of the APF sub modules of the APF 5003 should create the competitive setting list. Further, the platform API module 5002 creates the competitive setting list 6008 by merging the plural competitive function lists.

As just described, according to the present exemplary embodiment, the image processing device 100 which can control the image processing functions in regard to the request from the UAP is equipped with the setting competitive table 6005. Further, the image processing device 100 is equipped with the competitive discrimination section 6004 which verifies whether or not the request from the UAP conflicts with the competitive rule. Furthermore, the image processing device 100 is equipped with the platform API module 5002 which notifies the application of the competitive setting information discriminated by the competitive discrimination section 6004.

Second Exemplary Embodiment

In the first exemplary embodiment, the setting competing with the setting previously designated on the operation screen in FIG. 7 is set to be non-selectable as illustrated in FIG. 8

On the other hand, in the second exemplary embodiment, all the settings including the competitive settings are first set to be selectable. In the circumstances, if the one setting is selected and then the setting competing with the one setting is selected, the precedently selected setting (one setting) is canceled and an initial state is set so as to eliminate competition of the settings.

For example, if the "two page copy" setting is selected as "ON" and then the competitive "reduction layout" setting is selected, it is controlled to return the precedently selected "two page copy" setting (function) to "OFF".

In the second exemplary embodiment, the hardware constitution and the software configuration of the image processing device 100 are the same as those illustrated in FIGS. 1 to 5.

Figure 13:
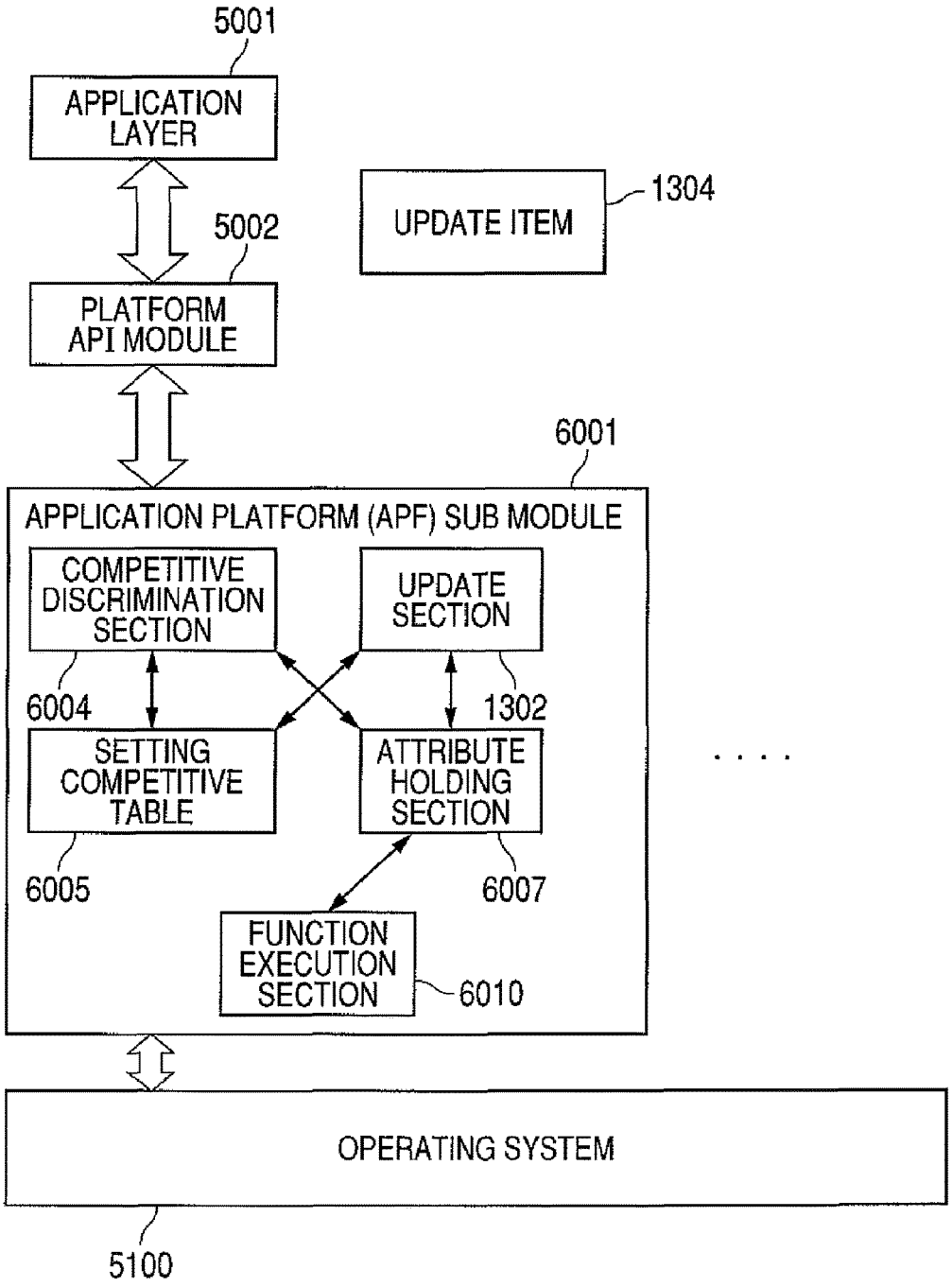
FIG. 13 is a block diagram illustrating the details of the sub modules of an application platform according to the second exemplary embodiment of the present invention.

FIG. 13 is a block diagram illustrating the details of the APF sub module 6001 according to the second exemplary embodiment. In FIG. 13, the same modules as those illustrated in FIG. 6 have the same reference numerals as those illustrated in FIG. 6, respectively, and the explanation thereof will be omitted.

In FIG. 13, the APF sub module 6001 is equipped with an update section 1302 which is the sub module different from that illustrated in FIG. 6. More specifically, the update section 1302 updates the attribute of the setting selected from the UAP (5201 to 5204) to a designated value (update item) 1304. Further, when updating the attribute, the update section 1302 refers to the setting competitive table 6005 and the attribute holding section 6007. Then, if it is discriminated based on the competitive rule that there is inconsistency, the update section 1302 returns the setting of the precedently designated function to its initial value.

Figure 11:
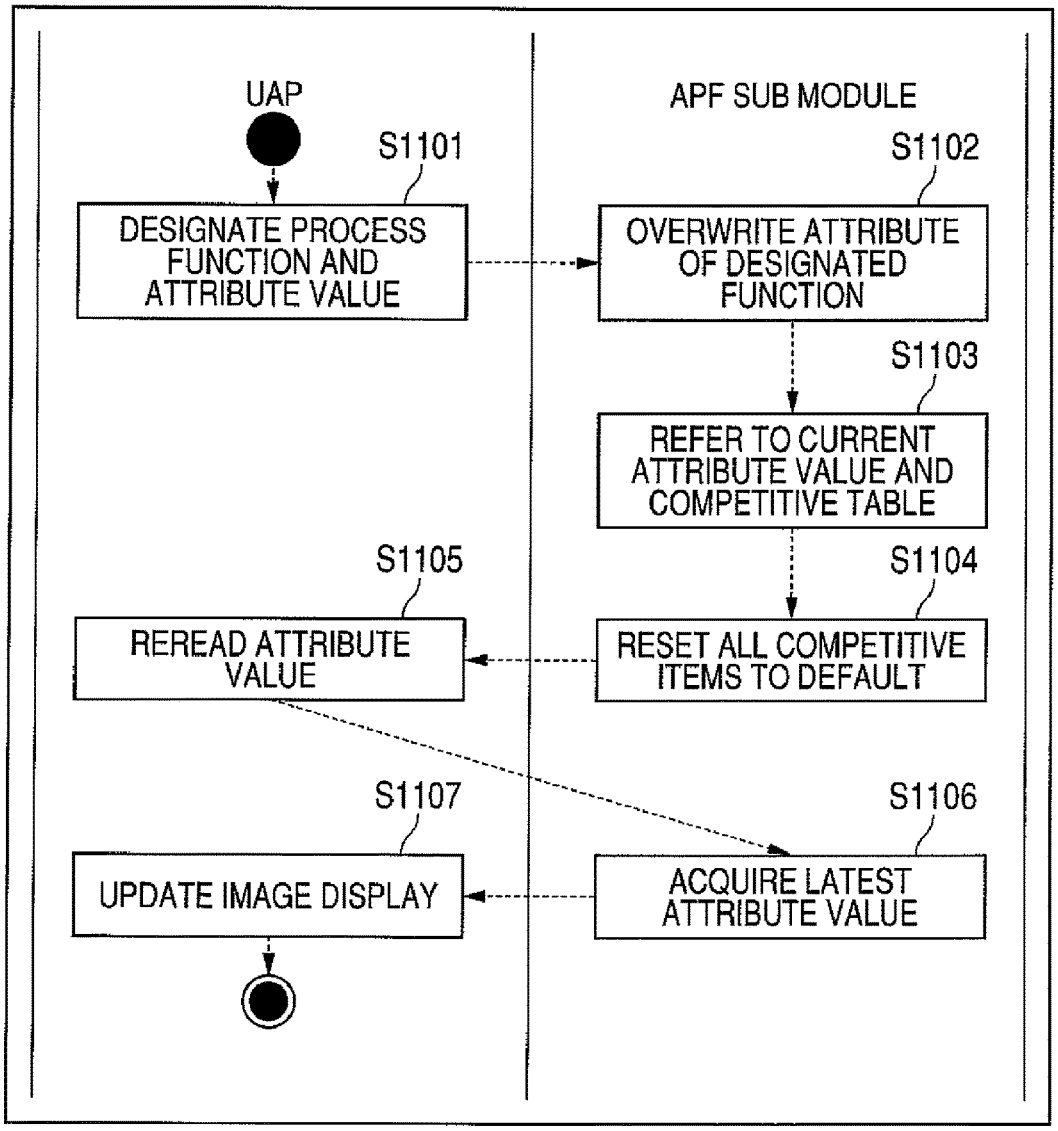
FIG. 11 is a diagram for describing the process to be executed by the UAP and the APF sub module according to the second exemplary embodiment of the present invention.

FIG. 11 is a diagram for describing a second data exchange to be executed between the UAP (any one of the UAPs 5201 to 5204) and the APF sub module 6001 in the image processing device according to the present exemplary embodiment. More specifically, FIG. 11 illustrates the process flow in case of resetting the setting value of the competitive setting to its initial state (default) so as to use an arbitrary function of the image processing device 100.

Incidentally, it should be noted that processes S1101, S1105 and S1107 are executed on the side of the application, and processes S1102, S1103, S1104 and S1106 are executed on the side of the APF sub module 6001, and each step is achieved if the CPU 112 illustrated in FIG. 4 executes the programs corresponding to the UAP (any one of the UAPs 5201 to 5204) illustrated in FIG. 5 and the APF sub module 6001.

In FIG. 11, first, the UAP determines the setting and the setting value in response to the operation executed on the operation unit 150 by the user (S1101).

Then, the APF which received the selection of the setting and the setting value through the platform API module 5002 updates the setting value of the selected setting (S1102).

The competitive discrimination section 6004 which is the sub module of the APF sub module 6001 refers to the setting competitive table 6005 and the attribute holding section 6007 (S1103).

Then, the competitive discrimination section 6004 creates the list of the settings competing with the settings set in the step S1101, and resets the setting values of the competitive settings to their initial values respectively (S1104). The acquired initial values which may be the non-selectable state of the relevant function and the like are transferred to the UAP.

Thus, the UAP which confirms that the value was updated rereads the setting value so as to reflect the setting value on the operation screen (S1105) If the UAP responds the latest setting value to the side of the APF sub module 6001, the APF sub module 6001 acquires the relevant setting value as the latest attribute value (S1106). Then, the UAP updates the operation screen of the operation unit 150 to the state corresponding to each setting value (S1107).

Consequently, even if an erroneous setting value is indicated from the UAP to the APF sub module 6001, it is possible to eliminate that the erroneous setting value of the UAP is reflected on the APF sub module 6001.

For example, on the operation screen illustrated in FIG. 7, if the setting button B1 corresponding to the "two page copy" setting is depressed and thereafter the setting button B2 corresponding to the "cover/interleaving" setting is depressed by the user, the "two page copy" setting which competes with the "cover/interleaving" setting is reset, whereby it is possible to select the "cover/interleaving" setting without selecting the competitive "two page copy" setting simultaneously.

Incidentally, the use of the function of platform in calling the API by the Java™ language is described in the present exemplary embodiment, but the use of the function of platform is not limited to this.

For example, if the function is provided by a Web service technique using a SOAP (Simple Object Access Protocol), the function of the image processing device 100 can be used through a network even from an application which operates at a physically distant location.

Third Exemplary Embodiment

In the above exemplary embodiments, the user application has been installed in the storage device of the image processing device 100. However, the user application may be acquired from a server or the like through a network.

Fourth Exemplary Embodiment

In the above exemplary embodiments, the case where the competitive settings concerning the image processing functions of the single image processing device 100 itself are eliminated is described.

However, in a case where an image processing function uses the plural image processing devices 100, it is possible to cause the device which indicated the setting to request the same process to another image processing device 100, edit or process the competitive information, and reflect the edited or processed information on the display state of the user interface.

Fifth Exemplary Embodiment

Hereinafter, the configuration of a data processing program which can be read by the information processing device according to the present invention will be described with reference to a memory map illustrated in FIG. 12.

Figure 12:
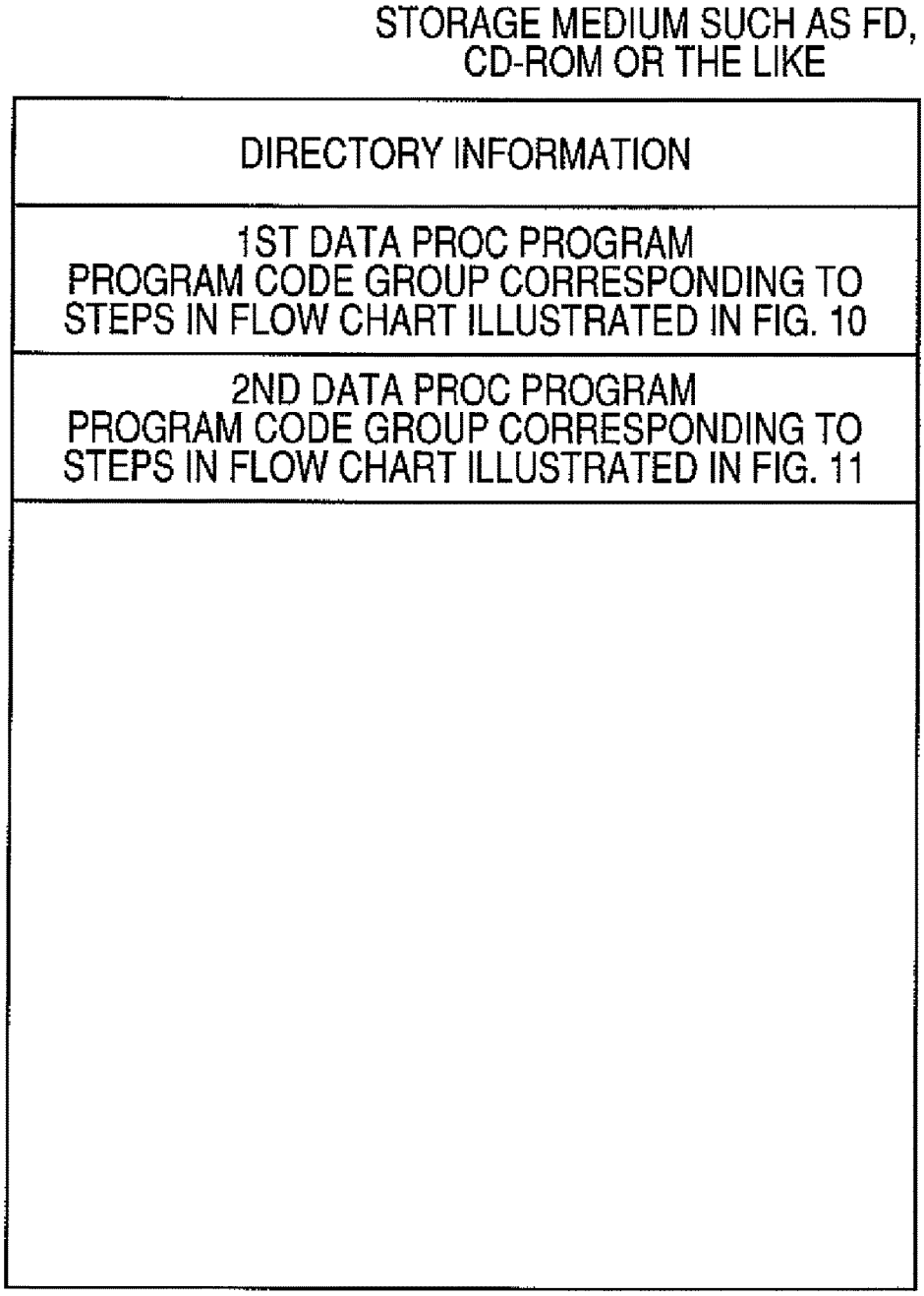
FIG. 12 is a diagram for describing a memory map of a storage medium which stores therein various data processing programs capable of being read by the image processing device according to the present invention.

FIG. 12 is a view for describing a memory map of a storage medium for storing various data processing programs which can be read by the information processing device according to the present invention.

Although not illustrated specifically, there is also a case that information of managing program groups stored in the storage medium such as, for example, version information and information of a creator are stored and information which depends on an OS (Operating System) at a program reading side such as, for example, information of icons for discriminatingly displaying programs are stored.

Furthermore, data which belongs to various programs is also managed by the above-mentioned directory. There is also a case that a program for installing various programs into a computer and a program for executing extraction when a program to be installed is compressed are stored.

The functions illustrated in FIGS. 10 and 11 in the present exemplary embodiment may be executed by a host computer by using a program installed externally. In this case, even if information groups which contain programs are supplied to an output device by the storage medium such as a CD-ROM, a flash memory or an FD, or from an external storage medium through a network, the present invention is applicable.

As described above, it is needless to say that a storage medium storing program codes of software for realizing the functions of the above-mentioned exemplary embodiments is supplied to a system or a device, and the object of the present invention can be achieved also in a case where a computer (or CPU or MPU) in the system or the device reads and executes the program codes stored in the storage medium.

In this case, the program codes themselves which were read from the storage medium realize the new functions of the present invention, and the storage medium which stores the relevant program codes constitutes the present invention.

Therefore, any form of a program, such as an object code, a program executed by an interpreter or script data to be supplied to an OS is available without inquiring a program form if having the function of a program.

As the storage medium for supplying the programs, for example, a flexible disk, a hard disk, an optical disk, a magnetooptical disk, an MO, a CD-ROM, a CD-R, a CD-RW, a magnetic tape, a nonvolatile memory card, a ROM, a DVD, or the like can be used.

In this case, the program codes themselves which were read from the storage medium realize the functions of the above-mentioned exemplary embodiments, and the storage medium which stores the relevant program codes constitutes the present invention.

As another method of supplying the programs, there is a method of connecting to a website on the Internet by using the browser of a client computer. The programs can be also supplied by downloading the computer program itself of the present invention or a file which is compressed and includes an automatic installing function into a recording medium such as a hard disk from the relevant website. Further, the supplying of the programs can be also realized by dividing program codes constituting the program of the present invention into plural files and downloading the respective files from different websites. That is, a WWW server or an ftp (file transfer protocol) server, which causes users to download program files for realizing the functional processes of the present invention by a computer, is also included in appended claims of the present invention.

The programs of the present invention are encoded and stored into the storage medium such as CD-ROMs which are distributed to users, and key information for solving or decoding the encoded program is made to be downloaded for the user who clears a predetermined condition from the website through the Internet. In addition, the user executes the encoded program by using the key information to install the program into a computer. Thus, the supplying of the program can be also realized.

It is needless to say that the present invention also includes not only a case where the functions of the above-mentioned exemplary embodiments are realized by executing the program codes read by a computer, but also a case where, for example, an OS (Operating System) functioning on the computer executes all the process or a part thereof based on the instruction of the program codes, thereby realizing the functions of the above-mentioned exemplary embodiments by that process.

Further, it is needless to say that the present invention also includes a case where the program codes read from a storage medium are written in a memory provided in a function expansion board inserted in the computer or a function expansion unit connected to the computer, and then a CPU provided in the function expansion board or the function expansion unit executes all the process or a part thereof based on the instruction of the relevant program codes, thereby realizing the functions of the above-mentioned exemplary embodiments by that process.

The present invention is not limited to the above-mentioned exemplary embodiments, but can be modified in various manners (including an organic combination of the respective exemplary embodiments) based on the spirit or the purpose of the present invention, and the various modifications are not excluded from the scope of the present invention.

Although various samples and exemplary embodiments of the present invention have been indicated and described, the spirit and scope of the present invention are not limited to a specific description in the present specifications for a person skilled in the art.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-102925 filed on Apr. 4, 2006, and No. 2007-061657 filed on Mar. 12, 2007 which are hereby incorporated by reference herein in their entirety.

What is claimed is:

1. An image processing device which [has plural] *includes one or more* functions *controlled by one or more function programs*, *the image processing device* comprising:

a processor [configured to execute a first] *that controls execution of an application platform* program [corresponding to] *providing* at least [one of the plural functions of the image processing device] *a function program of the one or more function programs* and *that controls execution of* a particular application program [using] *that accesses* the function [provided by the first] program, *wherein the application platform program and the particular application program communicate with each other via an application-program-interface ("API") module,* wherein the [first] *application platform* program, *the API module,* and the particular application program have been [installed on] *stored in* the image processing device, and wherein the [first] *application platform* program [can provide] *provides* the function *program* in [response to] *accordance with* a request from each of a plurality of application programs; and a storage unit [configured to store] *that stores* compatibility information, which is information concerning a combination of [settings] *setting items* capable of being used or a combination of [settings] *setting items* incapable of being used, wherein the [first program manages] *processor controls execution of* the [compatibility information, the] particular application program [selects any] *to select at least* one *setting* of plural settings with respect to at least [any one of] the [plural functions corresponding to] *function program provided by* the [first] *application platform* program,

*wherein* the [first] *processor controls execution of the application platform* program [discriminates,] *to:*

*receive from the particular application program an indication of the at least one setting selected* by [referring to] *the particular application program,*

*cause, in accordance with receipt of the indication of the at least one setting selected by the particular application program, identification, based on* the compatibility information, *of* whether or not competitive setting information exists, the competitive setting information defining at least that *a particular setting item corresponding to* one of the [plural settings] selected [by the particular application program] *at least one setting* is incapable of being used with another *setting item corresponding to another* selected setting, and [notifies]

*notify* the particular application program of information concerning the competitive setting information, in a case where the [first program discriminates that the] competitive setting information [exists] *is identified to exist*, and

*wherein* the [application] *processor controls execution of a* program [displays the notified information] *to display an operation screen* on an operation display unit *based on the notified information.*

2. An image processing device according to claim 1, wherein the operation display unit displays the plural settings, and accepts a selection of [the] setting information from a user, *and* wherein the [particular application program changes] *operation display unit changes* a display content of the operation display unit based on the *notified* information [concerning the competitive setting information notified by the first program].

3. An image processing device according to claim 2, wherein the operation display unit discriminably displays, to the user, that a selection of at least one of the plural settings cannot be accepted, based on the [information concerning the competitive setting information notified by the notification unit] *notified information.*

4. An image processing device according to claim 1, wherein

*the one or more functions is plural functions,* the storage unit stores plural of the compatibility information respectively corresponding to the plural functions, and the [first] *processor controls execution of the application platform* program [discriminates] *to cause identification of* whether or not the competitive setting information exists, [by referring to] *based on* the compatibility information corresponding to a specified function.

5. An image processing device which [has plural] *includes one or more function programs controlling one or more* functions*, the image processing device* comprising:

a processor [configured to execute a first] *that controls execution of an application platform* program [corresponding to] *providing* at least [one] *a function program* of [plural functions of the image processing device] *the one or more function programs* and *that controls execution of* a particular application program [using] *that accesses* the function [provided by the first] program, wherein the [first] *application platform* program and the particular application program *communicate with each other via an application-program-interface ("API") module, wherein the application platform program, the API module, and the particular application program* have been [installed on] *stored in* the image processing device, and wherein the [first] *application platform* program [can provide] *provides* the function *program* in [response to] *accordance with* a request from each of a plurality of application programs; and a storage unit [configured to store] *that stores* compatibility information, which is information concerning a combination of [settings] *setting items* capable of being used or a combination of [settings] *setting items* incapable of being used, wherein the [first program manages] *processor controls execution of* the [compatibility information, the] particular application program [selects any] *to select at least* one *setting* of plural settings with respect to at least [any one of] the [plural functions corresponding to] *function program provided by* the [first] *application platform* program, and

[the first program resets] *wherein the processor controls execution of the application platform program to cause a reset of* a *particular* setting *whose corresponding setting item is* incapable of being used with a setting *item corresponding to a setting* selected by the particular application program to a predetermined attribute value, [by referring to] *based on* the compatibility information.

6. An image processing device according to claim 5, wherein the [first] *processor controls execution of the application platform* program [notifies] *to notify* the particular application program of the predetermined attribute value.

7. An image processing device according to claim 6, further comprising a display unit [configured to display] *that displays* the plural settings, wherein the [application program updates the display on the] display unit *updates a display* concerning the *particular* setting *whose corresponding setting item is* incapable of being used with the setting *item corresponding to the setting* selected by the particular application program, based on the *notified* predetermined attribute value [notified by the notification unit].

8. An image processing device according to claim 5, wherein the [first] *processor controls execution of the application platform* program [sets] *to cause setting of* the *particular* setting *whose corresponding setting item is* incapable of being used with the setting *item corresponding to the setting* selected by the particular application program, to be in a non-selectable state.

9. A control method implemented by an image processing device which [has plural] *includes one or more* functions *controlled by one or more function programs* and comprises a processor [configured to execute] *and* a [first] *storage unit, the method comprising:*

*controlling execution, via the processor, of an application platform* program [corresponding to] *providing* at least [one of plural functions of the image processing device and] *a function program of the one or more function programs;*

*controlling execution, via the processor, of* a particular application program [using] *that accesses* the function [provided by the first] program*;*

*controlling execution, via the processor, of an application-program-interface ("API") module to transmit communication between the application platform program and the particular application* program, wherein the [first] *application platform* program*, the API module,* and the particular application program have been [installed on] *stored in* the image processing device, and wherein the [first] *application platform* program [can provide] *provides* the function *program* in [response to] *accordance with* a request from each of a plurality of application programs[, the control method comprising the steps of:]*;* selecting, [by] *via the processor controlling execution of* the particular application program, [any] *at least* one *setting* of plural settings with respect to at least [any one] *the function program provided by the application platform program;*

*receiving, via the processor controlling execution of the application platform program, an indication, from the particular application program,* of the [plural functions corresponding to the first program; discriminating, by the first program,] *at least one setting selected by the particular application program,*

*causing, via the processor controlling execution of the application platform program and in accordance with receipt of the indication of the at least one setting selected by the particular application program, identification, based on compatibility information stored by the storage unit, of* whether or not competitive setting information [n] exists, the competitive setting information defining at least that *a particular setting item corresponding to* one of the [plural settings] selected [by the particular application program] *at least one setting* is incapable of being used with another[setting item corresponding to another] selected setting [by referring to a storage unit which stores], *the* compatibility [information, which is] information concerning a combination of [settings] *setting items* capable of being used or a combination of [settings] *setting items* incapable of being used; and notifying, [by the first] *via the processor controlling execution of the application platform* program, the particular application program of information concerning the competitive setting information, in a case where [it is discriminated in the discriminating step that] the competitive setting information [exists] *is identified to exist.*

10. A control method implemented by an image processing device which [has plural] *includes one or more function programs controlling one or more* functions and comprises a processor [configured to execute] *and* a [first] *storage unit, the method comprising:*

*controlling execution, via the processor, of an application platform* program [corresponding to] *providing* at least [one of plural functions of the image processing device and] *a function program of the one or more function programs;*

*controlling execution, via the processor, of* a particular application program [using] *that accesses* the function [provided by the first] program*;*

*controlling execution, via the processor, of an application-program-interface ("API") module to transmit communication between the application platform program and the particular application* program, wherein the [first] *application platform* program*, the API module,* and the particular application program have been [installed on] *stored in* the image processing device, and wherein the [first] *application platform* program [can provide] *provides* the function *program* in [response to] *accordance with* a request from each of [the plural] *a plurality of* application programs[, the control method comprising the steps of:]*;* selecting, [by] *via the processor controlling execution of* the particular application program, [any] *at least* one *setting* of plural settings with respect to at least [any one of] the [plural functions corresponding to] *function program provided by* the [first] *application platform* program; and

*causing* resetting, [by the first] *via the processor controlling execution of the application platform* program, *of* a *particular* setting *whose corresponding setting item is* incapable of being used with a setting *item corresponding to the setting* selected in the selecting step by the particular application program to a predetermined attribute value, [by referring to a storage unit which stores] based on compatibility information stored by the storage unit, the compatibility information concerning a combination of [settings] *setting items* capable of being used or a combination of [settings] *setting items* incapable of being used.

*11. An image processing device comprising:*

*a storage unit that stores conflict information, which is information concerning a conflict of setting items corresponding to settings of one or more functions of the image processing device; and*

*a processor that controls execution of an application platform program and an application program at least to communicate with each other via an application-program-interface ("API") module,*

*wherein the application platform program, the application program, and the API module are stored in the image processing device,*

*wherein at least one setting of the one or more functions is able to be designated in the application program,*

*wherein the application program calls the API module to communicate with the application platform program,*

*wherein the processor controls execution of the application program to cause the application program to be designated with at least one setting with respect to the one or more functions, and*

*wherein the processor controls execution of the application platform program to cause the application platform program to cause a reset of a particular setting whose corresponding setting item has a conflict, based on the conflict information, with another setting item corresponding to a setting designated in the application program, the particular setting reset to a predetermined setting value.*

*12. An image processing device according to claim 11, wherein the processor controls execution of the application platform program to cause the application platform program to notify the application program of the predetermined setting value.*

*13. An image processing device according to claim 12, further comprising a display unit that displays plural settings,*

*wherein the display unit updates a display of the display unit concerning the particular setting that has the conflict with the setting designated in the application program, based on the notified predetermined setting value.*

*14. An image processing device according to claim 11, wherein the processor controls execution of the application platform program to cause setting of the particular setting to be in a non-selectable state.*

*15. A control method implemented by an image processing device which comprises a storage unit and a processor that controls execution of an application platform program and an application program, the method comprising:*

*controlling execution, via the processor, of the application program to cause the application program to call an application-program-interface ("API") module to communicate with the application platform program, wherein the application platform program, the application program, and the API module are stored in the image processing device;*

*causing the application program to input, via the processor controlling execution of the application program, at least one setting of one or more functions of the image processing device:*

*causing the application platform program to receive, via the processor controlling execution of the application platform program, an indication, from the application program, of the at least one setting of the one or more functions of the image processing device and input in the application program;*

*causing, via the processor controlling execution of the application platform program and in accordance with receipt of the indication of the at least one setting from the application program, the application program to identify, based on conflict information stored by the storage unit, whether a conflicted setting item exists, the conflicted setting item corresponding to at least one of the input at least one setting, and the conflicted setting item conflicting with another setting item corresponding to a selected setting of the one or more functions, the conflict information identifying conflicts between setting items corresponding to settings of the one or more functions; and*

*causing the application platform program to provide a notification, via the processor controlling execution of the application platform program, to the application program of information identifying the conflicted setting item which is identified to exist.*

*16. A control method according to claim 15,*

*wherein the image processing device further comprises a display, and*

*wherein the method further comprises the display displaying a screen affected by the identification that the conflicted setting item exists in accordance with the notification provided by the application platform pro-*

*gram, via the processor controlling execution of the application platform program, to the application program of the information identifying the conflicted setting item, which is identified to exist.*

*17. A control method according to claim 16, further comprising the display displaying an operation screen not including an input item allowing input of a conflicted setting item which conflicts with at least one setting item of the one or more functions.*

*18. A control method according to claim 15, wherein the one or more functions include at least a scanner function, and the identification of whether or not the conflicted setting item exists is at least in part in regard to a process associated with at least the scanner function.*

*19. A control method according to claim 15, wherein the one or more functions include at least a printing function, and the identification of whether the conflicted setting item exists is at least in part in regard to a process associated with at least the printing function.*

*20. A control method according to claim 15, wherein the conflicted setting item is related to a setting item corresponding to a setting regarding at least one of an inserting of a sheet, a book binding, or a printing in which at least two pages are laid out on a surface of one sheet.*

*21. A control method implemented by an image processing device which includes one or more functions and comprises a processor and a storage unit, the method comprising:*

*controlling execution of an application program, via the processor, to cause the application program to call an application-program-interface ("API") module to communicate with an application platform program, wherein the application platform program, the application program, and the API module are stored in the image processing device;*

*causing the application program to accept, via the processor controlling execution of the application program, at least one input of a setting with respect to at least one function of the one or more functions of the image processing device; and*

*causing the application platform program to reset, via the processor controlling execution of the application platform program, a particular setting whose corresponding setting item has a conflict, based on conflict information stored by the storage unit, with a setting item corresponding to the setting input to the application program, the particular setting reset to a predetermined setting value, and the conflict information concerning a conflict of setting items corresponding to settings regarding the at least one function of the one or more functions of the image processing device.*

*22. An apparatus that stores an application platform, a first application, and a second application, the apparatus comprising:*

*at least one processor; and*

*a storage unit that stores information indicating a conflict of settings,*

*wherein the application platform is executed by the at least one processor and is configured to:*

*(i) receive information indicating a setting via a platform application program interface module from the first application on which the setting has been selected by a user,*

*(ii) identify, based on the stored information, another selected setting that conflicts with the selected setting indicated by the information received from the first application,*

*(iii) provide, to the first application, information indicating the identified another selected setting that conflicts with the selected setting indicated by the information received from the first application,*

*(iv) receive, via the platform application program interface module, via which the information indicating the setting is received from the first application, information indicating a setting from the second application on which the setting has been selected by a user,*

*(v) identify, based on the stored information, another selected setting that conflicts with the selected setting indicated by the information received from the second application, and*

*(vi) provide, to the second application, information indicating the identified another selected setting that conflicts with the selected setting indicated by the information received from the second application.*

*23. An apparatus according to claim 22, wherein the apparatus is a copier.*

*24. An apparatus according to claim 23, wherein (a) the selected setting indicated by the information received from the first application and the identified another selected setting that conflicts with the selected setting indicated by the information received from the first application are settings of a printing function provided by the apparatus, or (b) the selected setting indicated by the information received from the second application and the identified another selected setting that conflicts with the selected setting indicated by the information received from the second application are settings of a printing function provided by the apparatus.*

*25. An apparatus according to claim 22, wherein the stored information indicates that at least some of the settings conflict with each other.*

*26. An apparatus according to claim 22, wherein the stored information includes combinations of settings that do not conflict with each other.*

*27. An apparatus according to claim 22, wherein the application platform runs on an operation system of the apparatus.*

*28. An apparatus according to claim 22, wherein the another selected setting that conflicts with the selected setting indicated by the information received from the first application is a first setting, and the selected setting indicated by the information received from the first application is a second setting, and wherein the first setting conflicts with the second setting at least because the first setting cannot be enabled while the second setting is enabled.*

*29. An apparatus that stores a first application, a second application, and an application platform commonly operating for the first and second applications, the apparatus comprising:*

*at least one processor; and*

*a storage unit that stores information indicating a conflict of settings commonly referred to for the first and second applications,*

*wherein the application platform is executed by the at least one processor and is configured to:*

*(i) receive, from the first application on which settings have been selected by a user, information indicating the selected settings via a platform application program interface module,*

*(ii) determine, by referring to the stored information, whether the selected settings indicated by the received information from the first application conflict with each other,*

(iii) *provide information based on the determination of* (ii) *to the first application,*

(iv) *receive, from the second application on which settings have been selected by a user, information indicating the selected settings via the platform application program interface module,*

(v) *determine, by referring to the stored information, whether the selected settings indicated by the received information from the second application conflict with each other, and*

(vi) *provide information based on the determination of* (v) *to the second application.*

*30. An apparatus according to claim 29, wherein the apparatus is a copier.*

*31. An apparatus according to claim 29, wherein the storage unit stores the information indicating the conflict of settings of a function provided by the apparatus.*

*32. An apparatus according to claim 29, wherein the application platform is configured to provide the information according to* (iii), (vi), *or both* (iii) *and* (vi) *based on the respective determination or determinations via the platform application program interface module that is used in* (i), (iv), *or both* (i) *and* (iv), *respectively.*

*33. An apparatus according to claim 29, wherein the stored information indicates that the settings indicated by the received information from* (i), (iv), *or each of* (i) *and* (iv) *conflict with each other.*

*34. An apparatus according to claim 29, wherein the stored information includes combinations of settings that do not conflict with each other.*

*35. An apparatus according to claim 29, wherein the application platform runs on an operation system of the apparatus.*

*36. An apparatus according to claim 29, wherein the settings indicated by the received information from* (i), (iv), *or each of* (i) *and* (iv) *conflict with each other at least because one of the settings indicated by the respective received information cannot be enabled while another one of the settings indicated by the respective received information is enabled.*

*37. A control method implemented by an apparatus that stores an application platform, a first application, and a second application, and includes at least one processor and a storage unit, the method comprising:*

*storing, in the storage unit, information indicating a conflict of settings;*

(i) *receiving, via one or more of the at least one processor controlling execution of the application platform, information indicating a setting via a platform application program interface module from the first application on which the setting has been selected by a user;*

(ii) *identifying, based on the stored information, and via one or more of the at least one processor controlling execution of the application platform, another selected setting that conflicts with the selected setting indicated by the information received from the first application;*

(iii) *providing, to the first application via one or more of the at least one processor controlling execution of the application platform, information indicating the identified another selected setting that conflicts with the selected setting indicated by the information received from the first application,*

(iv) *receiving, via one or more of the at least one processor controlling execution of the application platform and via the platform application program interface module via which the information indicating the setting is received from the first application, information indicating a setting from the second application on which the setting has been selected by a user;*

(v) *identifying, based on the stored information, and via one or more of the at least one processor controlling execution of the application platform, another selected setting that conflicts with the selected setting indicated by the information received from the second application; and*

(vi) *providing, to the second application via one or more of the at least one processor controlling execution of the application platform, information indicating the identified another selected setting that conflicts with the selected setting indicated by the information received from the second application.*

*38. A control method according to claim 37, wherein the apparatus is a copier.*

*39. A control method according to claim 38, wherein* (a) *the selected setting indicated by the information received from the first application and the identified another selected setting that conflicts with the selected setting indicated by the information received from the first application are settings of a printing function provided by the apparatus, or* (b) *the selected setting indicated by the information received from the second application and the identified another selected setting that conflicts with the selected setting indicated by the information received from the second application are settings of a printing function provided by the apparatus.*

*40. A control method according to claim 37, wherein the stored information indicates that at least some of the settings conflict with each other.*

*41. A control method according to claim 37, wherein the stored information includes combinations of settings that do not conflict with each other.*

*42. A control method according to claim 37, wherein the application platform runs on an operation system of the apparatus.*

*43. A control method according to claim 37, wherein the another selected setting that conflicts with the selected setting indicated by the information received from the first application is a first setting, and the selected setting indicated by the information received from the first application is a second setting, and wherein the first setting conflicts with the second setting at least because the first setting cannot be enabled while the second setting is enabled.*

*44. A control method implemented by an apparatus that stores a first application, a second application, and an application platform commonly operating for the first and second applications, the method comprising:*

*storing, in a storage unit, information indicating a conflict of settings commonly referred to for the first and second applications;*

(i) *receiving, from the first application on which settings have been selected by a user, information indicating the selected settings via a platform application program interface module;*

(ii) *determining, by referring to the stored information, whether the selected settings indicated by the received information from the first application conflict with each other;*

(iii) *providing information based on the determination of* (ii) *to the first application;*

(iv) *receiving, from the second application on which settings have been selected by a user, information indicating the selected settings via the platform application program interface module;*

(v) *determining, by referring to the stored information, whether the selected settings indicated by the received information from the second application conflict with each other; and*

(vi) *providing information based on the determination of* (v) *to the second application.*

*45. A control method according to claim 44, wherein the apparatus is a copier.*

*46. A control method according to claim 44, wherein the storage unit stores the information indicating the conflict of settings of a function provided by the apparatus.*

*47. A control method according to claim 44, wherein the application platform is configured to provide the information according to* (iii), (vi), *or both* (iii) *and* (vi) *based on the respective determination or determinations via the platform application program interface module that is used in* (i), (iv), *or both* (i) *and* (iv), *respectively.*

*48. A control method according to claim 44, wherein the stored information indicates that the settings indicated by the received information from* (i), (iv), *or each of* (i) *and* (iv) *conflict with each other.*

*49. A control method according to claim 44, wherein the stored information includes combinations of settings that do not conflict with each other.*

*50. A control method according to claim 44, wherein the application platform runs on an operation system of the apparatus.*

*51. A control method according to claim 44, wherein the settings indicated by the received information from* (i), (iv), *or each of* (i) *and* (iv) *conflict with each other at least because one of the settings indicated by the respective received information cannot be enabled while another one of the settings indicated by the respective received information is enabled.*

* * * * *